US010223835B2

(12) United States Patent
Cashen et al.

(10) Patent No.: US 10,223,835 B2
(45) Date of Patent: Mar. 5, 2019

(54) AUGMENTED REALITY ALIGNMENT SYSTEM AND METHOD

(71) Applicant: N.S. International, LTD, Troy, MI (US)

(72) Inventors: Daniel Cashen, Troy, MI (US); Emily Robb, Lakeport, MI (US)

(73) Assignee: N.S. International, Ltd., Troy, MI (US)

( * ) Notice: Subject to any disclaimer, the term of this patent is extended or adjusted under 35 U.S.C. 154(b) by 0 days.

(21) Appl. No.: 15/972,366

(22) Filed: May 7, 2018

(65) Prior Publication Data

US 2018/0253907 A1    Sep. 6, 2018

Related U.S. Application Data

(63) Continuation of application No. 14/969,762, filed on Dec. 15, 2015.

(51) Int. Cl.
| | |
|---|---|
| *G09G 5/00* | (2006.01) |
| *G06T 19/00* | (2011.01) |
| *G06T 19/20* | (2011.01) |
| *G02B 27/01* | (2006.01) |
| *G06T 7/50* | (2017.01) |
| *G06F 3/01* | (2006.01) |

(52) U.S. Cl.
CPC ........ *G06T 19/006* (2013.01); *G02B 27/0101* (2013.01); *G06F 3/013* (2013.01); *G06T 7/50* (2017.01); *G06T 19/20* (2013.01); *G02B 2027/014* (2013.01); *G02B 2027/0138* (2013.01); *G06T 2207/30268* (2013.01); *G06T 2219/2004* (2013.01)

(58) Field of Classification Search
CPC ......... G06T 19/006; G06T 7/50; G06T 19/20; G02B 27/0101; G06F 3/013
USPC ........................................ 345/619, 632, 633
See application file for complete search history.

(56) References Cited

U.S. PATENT DOCUMENTS

| | | | |
|---|---|---|---|
| 7,167,779 B2 | 1/2007 | Kashiwada et al. |
| 7,271,960 B2 | 9/2007 | Stewart et al. |
| 7,592,997 B2 | 9/2009 | Evers-Senne et al. |
| 8,264,505 B2 | 9/2012 | Bathiche et al. |
| 8,358,224 B2 | 1/2013 | Seder et al. |
| 8,406,562 B2 | 3/2013 | Bassi et al. |
| 8,416,263 B2 | 4/2013 | Leung |

(Continued)

OTHER PUBLICATIONS

Hua, Hong, Chunyu Gao, and Narendra Ahuja: "Calibration of a Head-Mounted Projective Display for Augmented Reality Systems." Proceedings of the International Symposium on Mixed and Augmented Reality, 2002. ISMAR 2002. IEEE, 2002, pp. 1-10.

*Primary Examiner* — Sarah Lhymn
(74) *Attorney, Agent, or Firm* — Butzel Long, PC; Gunther J. Evanina

(57) ABSTRACT

Various embodiments of an augmented reality alignment system and method are disclosed. An exemplary alignment system and method therefor may correct for image misalignment, distortion, and image deflection of graphic images that are projected within an operator's field of view. The alignment system may be configured to consider a number of dynamic and static error factor inputs in real time such that when a graphic image is projected, the graphic image is substantially aligned with the real-world target it is intended to overlay and the graphic image is displayed substantially free of distortion.

16 Claims, 21 Drawing Sheets

(56) References Cited

U.S. PATENT DOCUMENTS

| | | |
|---|---|---|
| 8,564,502 B2 | 10/2013 | Cui et al. |
| 8,619,248 B2 | 12/2013 | Bassi et al. |
| 8,768,094 B2 | 7/2014 | Bassi et al. |
| 8,797,356 B2 | 8/2014 | Leung |
| 8,845,110 B1 | 9/2014 | Worley, III |
| 8,994,558 B2 | 3/2015 | Kim et al. |
| 2006/0176242 A1 | 8/2006 | Jaramaz et al. |
| 2006/0244820 A1 | 11/2006 | Morita |
| 2006/0250322 A1 | 11/2006 | Hall et al. |
| 2007/0146391 A1 | 6/2007 | Pentenrieder |
| 2012/0120103 A1 | 5/2012 | Border et al. |
| 2013/0187952 A1 | 7/2013 | Berkovich et al. |
| 2013/0194110 A1* | 8/2013 | Kim ................ G02B 27/01 340/905 |
| 2013/0342573 A1 | 12/2013 | Leazenby et al. |
| 2014/0092135 A1 | 4/2014 | McArdle et al. |
| 2014/0160012 A1* | 6/2014 | Su .................. G06F 3/005 345/156 |
| 2014/0168264 A1 | 6/2014 | Harrison et al. |
| 2014/0267398 A1 | 9/2014 | Beckwith et al. |
| 2014/0268353 A1 | 9/2014 | Fujimura |
| 2015/0294505 A1 | 10/2015 | Atsmon |
| 2015/0309264 A1 | 10/2015 | Abovitz |
| 2015/0331236 A1 | 11/2015 | Roth et al. |
| 2015/0332506 A1 | 11/2015 | Aratani |
| 2015/0332512 A1 | 11/2015 | Siddiqui et al. |
| 2015/0350618 A1 | 12/2015 | Meier et al. |
| 2015/0355461 A1 | 12/2015 | Kessler |
| 2016/0163108 A1* | 6/2016 | Kim ................ G02B 27/0101 345/633 |

\* cited by examiner

| Item | Shorter | Medium | Taller |
|---|---|---|---|
| Look Down Angle | 0 deg. | 5 deg. | 10 deg. |
| Eye Point Shift | -150 mm | Reference | +150 mm |

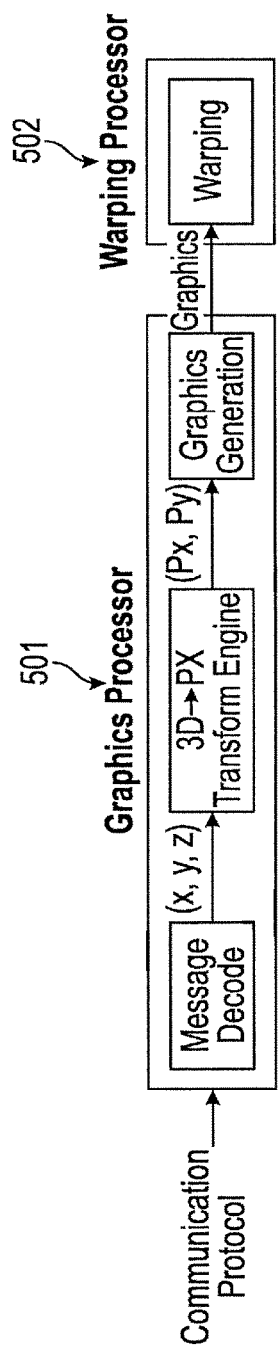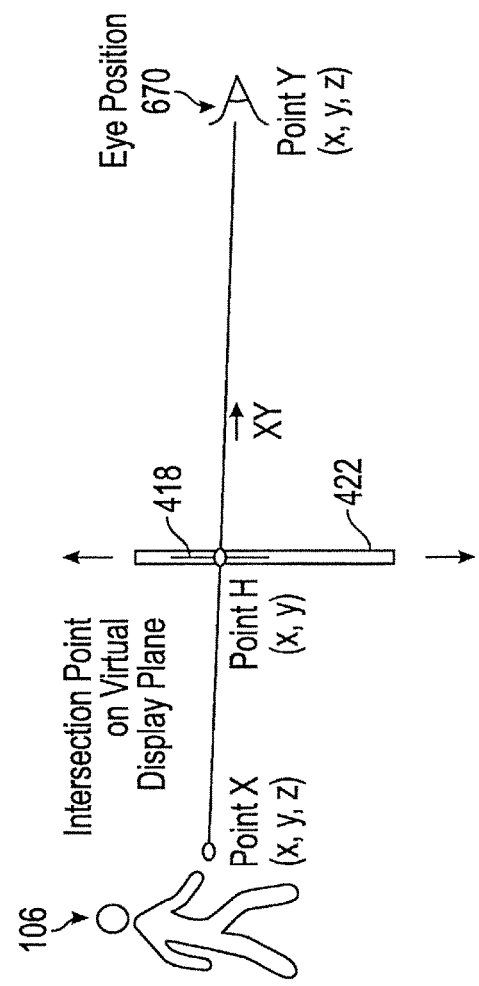

AUGMENTED REALITY ALIGNMENT SYSTEM AND METHOD

CROSS-REFERENCE TO RELATED APPLICATION

This continuation application claims priority to U.S. patent application Ser. No. 14/969,762, filed on Dec. 15, 2015, and is hereby incorporated by reference in its entirety.

BACKGROUND

Augmented reality (AR) systems may augment an operator's real-world reality by overlaying real-world targets with graphic images within the operator's Field of View (FOV). Accordingly, an operator may view, assess, and make decisions based on those images without ever looking away, and thus, the operator's experience and perception of reality may be enhanced by an AR system.

AR systems have been implemented in a number of applications, including but not limited to automobiles, aircraft, trains, helmets, and glasses. For example, AR systems have been used in automobiles to enhance an operator's ability to perceive the road scene, thereby reducing operator perception accidents. AR systems have also been developed for military vehicles, helmets, and glasses to enhance a soldier's ability to perceive the battlefield environment, including the ability to quickly identify a target as friend or foe, and even the ability to track targets in poor environmental conditions. AR systems have also been implemented in aircrafts. For instance, AR systems may assist a pilot-in-training with his or her approach slope for landings by highlighting the slope with virtual images.

AR systems have the ability to substantially enhance an operator's experience and safety. As noted above, AR systems can reduce the number of automobile accidents caused by operator perception and inattention by highlighting real-world targets that may be potential road hazards. Despite the apparent benefits of an AR system, a system may be detrimental if it decreases the resolution or accuracy of the operator's native senses (i.e., the operator's perception of reality without augmentation). Accordingly, it is imperative that virtual images projected by an AR system be spatially accurate to the operator's real-world perception of reality.

An AR system may be detrimental to an operator if the virtual images projected by the system are misaligned (i.e., the virtual images are not positioned correctly with respect to the real-world targets they are intended to overlay) and/or the virtual images are distorted. Misalignment and distortion can be caused by a number of factors, including the constraints of sensing, registration, graphics rendering, and display units of an AR system, the orientation of the operator or the operator's vehicle in transport, the kinematics of the operator with respect to a real-world target, system latency, and mass production build and mounting variation of AR system parts that have a bearing on the functionality and accuracy of an AR system, such as a windshield of an automobile. AR systems having low latency and capable of producing aligned, substantially distortion free, high accuracy virtual images overlaying real-world targets have not been achieved, especially those systems produced on a production scale. Thus, there is a need for an improved augmented reality alignment system and method therefor that solves these noted challenges.

SUMMARY

Many of the challenges noted above may be solved by an augmented reality alignment system that applies a series of corrections and predicted corrections based on static and dynamic error factor inputs in real time such that a projected image may correctly align with its intended real-world target and be displayed substantially free of distortion.

In another aspect, a method for alignment and distortion correction for augmented reality systems is disclosed. The method generally includes receiving a target position input, translating the target position input into a pixel position while considering a number of dynamic error factor inputs in real time, generating a graphic output, and correcting the graphic output for image distortion based on a number of dynamic and static error factor inputs in real time such that when the graphic output is projected, an image appears within an operator's FOV aligned with its intended real-world target and displayed substantially free of distortion.

BRIEF DESCRIPTION OF THE DRAWINGS

FIG. 20 illustrates an exemplary process flow of an exemplary graphics processor;

FIG. 21 illustrates how the transform engine calculates the appropriate position for an image to be displayed on the virtual display plane;

DETAILED DESCRIPTION

Multiple embodiments of an augmented reality system 100 (AR system) and an alignment system 500 therefor are described with reference to the drawings, wherein like numerals reference like structures. Although the alignment system 500 may be illustrated and described herein as including particular components in a particular configuration, the components and configuration shown and described are provided for example purposes only. The figures and descriptions of the embodiments described herein are not intended to limit the breadth or the scope of the inventive concepts or the appended claims in any manner. Rather, the figures and detailed descriptions of the alignment system 500 are provided to illustrate the inventive concepts to a person of ordinary skill in the art and to enable such person to make and use the inventive concepts. While AR systems have numerous applications spanning many different industries, an exemplary AR system 100 comprising an alignment system 500 for use in an automobile will be described herein.

The terms "alignment system" and "alignment method" as those terms are used herein generally describe a system and/or method therefore that may correct for misalignment and/or distortion of projected graphic images. Correcting for image "misalignment" as that term is used herein generally refers to correcting misalignment of an image in a three-dimensional space (3D). Correcting for image "distortion" as that term is used herein generally refers to correcting distortion of an image in a two-dimensional space (2D). Correcting for "image deflection" or "deflection" as that term is used herein generally refers to correcting image deflection in 2D as well. Image deflection is a form of image distortion caused by system latency during the graphics rendering stage, as will be described in greater detail herein. Although distortion and image deflection can be thought of as a form of image misalignment, the above-noted terms will be used herein to distinguish the dimensional space in which a misaligned image is being corrected for (i.e., to distinguish whether the image is being corrected for in 3D or 2D space). "Image warping" or simply "warping" as that term is used herein generally refers to correcting for image distortion and/or image deflection in 2D. The term "driver" and "operator" are used interchangeably herein.

Figure 1:
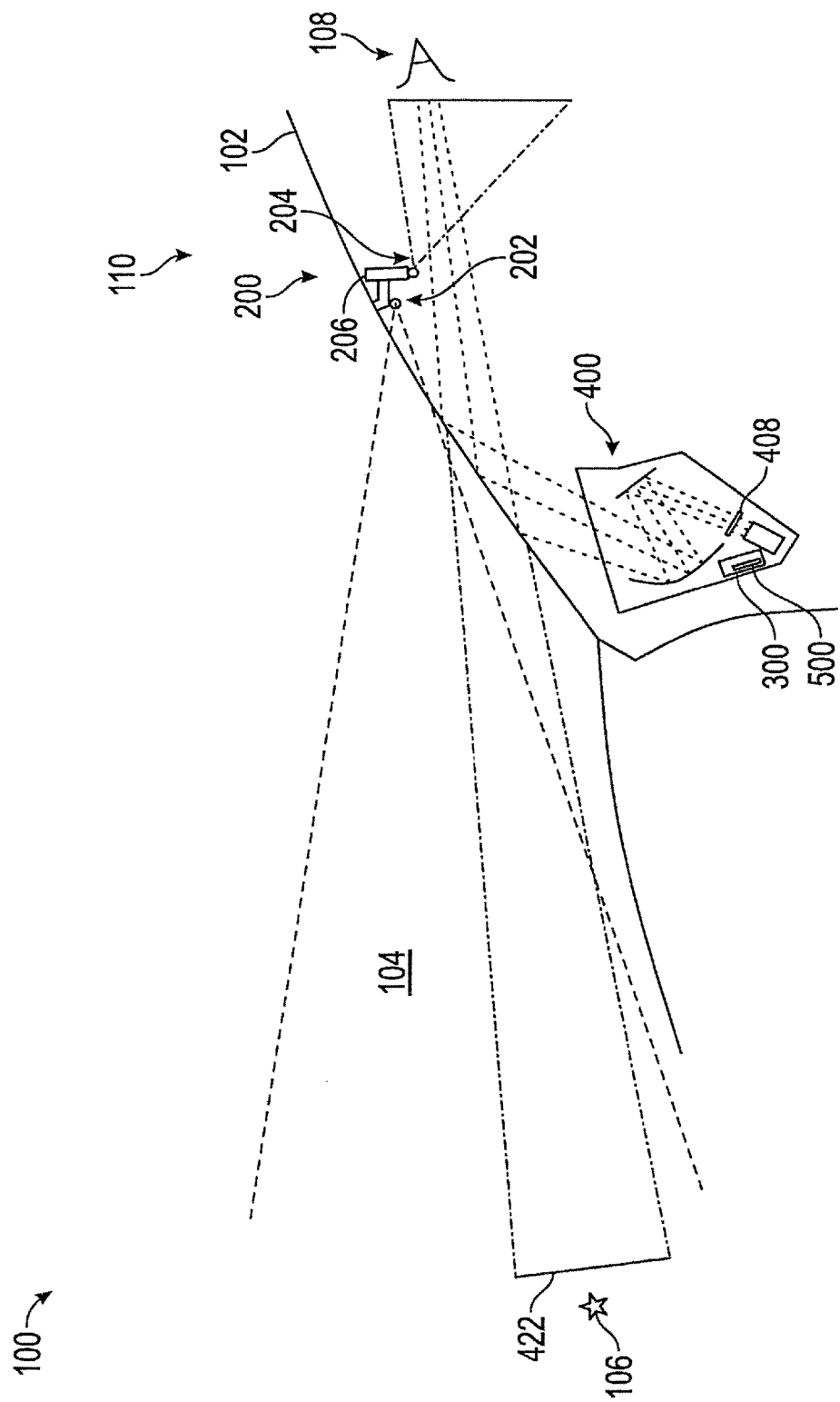
FIG. 1 depicts an exemplary augmented reality system.

Turning now to the drawings, FIG. 1 depicts an exemplary AR system 100 for use in a vehicle 110, such as an automobile. An AR system 100 may comprise: a sensing unit 200, a graphics unit 300, and a display unit 400. The graphics unit 300 may comprise an alignment system 500 that may be configured to correct for misalignment and distortion of projected virtual images by considering a number of dynamic error factor inputs and static error factor inputs in real time. The sensing unit 200, graphics unit 300, display unit 400, and the alignment system 500 operate, in combination, to overlay real-world targets 106 with graphic images that are both properly aligned with their intended real-world targets 106 and displayed substantially free of distortion.

Figure 2:
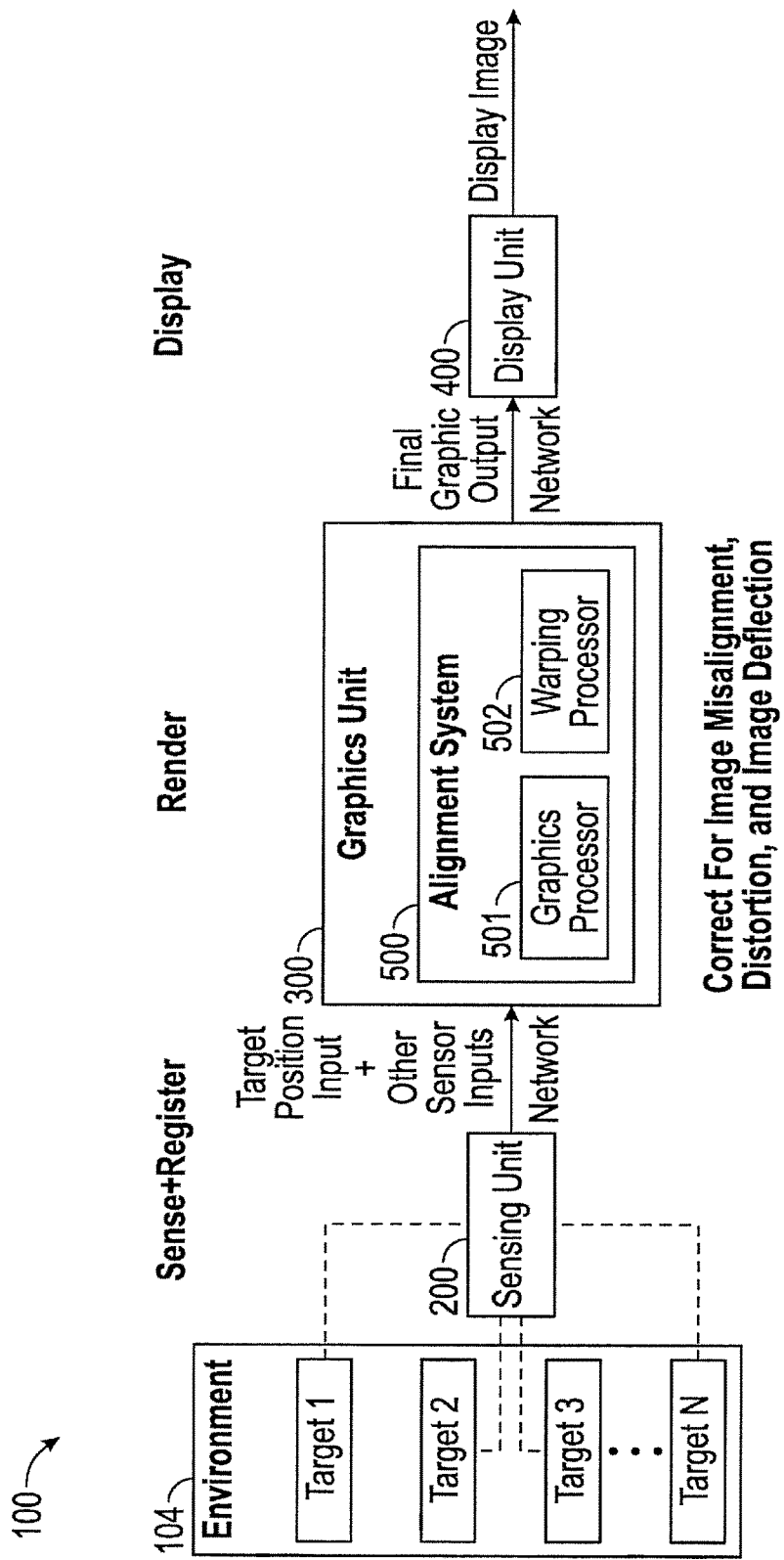
FIG. 2 shows an exemplary process flow of an augmented reality system.

Referring generally now to FIGS. 1 and 2, the named units may collectively perform the following general steps of an AR system 100: sensing the environment 104 for real-world targets 106; registering the sensed real-world target 106; rendering a graphic output; and displaying the graphic output as a graphic image overlaying its real-world target 106. In short, the process of the AR system 100 comprises the following steps: Sense→Register→Render→Display. Generally, the sensing unit 200 performs the sensing tasks; the sensing unit 200 or graphics unit 300 may register the sensed real-world target 106; the graphics unit 300 renders a graphic output considering a number of dynamic and static error factor inputs and the alignment system 500 corrects the graphic output for image misalignment, distortion, and image deflection; and finally, the display unit 400 projects the graphic output such that a virtual image is rendered within an operator's FOV to augment the operator's reality.

The units of the AR system 100 will now herein be described in more detail. The sensing unit 200 monitors and senses targets 106 within a given environment 104, or in the automotive context, the road scene. The sensing unit 200 may comprise various sensors known in the art, including a Forward Camera Module (FCM) 202, as depicted in FIG. 1. FCM 202 may comprise one or more cameras. Sensing unit 200 may also comprise other sensors including but not limited to: mono and stereo cameras, rear cameras, ultra sound, lidar, radar, infrared, passive infrared, thermal, Time of Flight (TOF), speed sensors, ambient light sensors, MEMS, and GPS, for example. Indeed, sensing unit 200 may be made up of sensors developed for Advanced Driver Assistance Systems (ADAS), such as Lane Departure Warning (LDW), Forward Collision Alert (FCA), and Traffic Sign Monitoring (TSM) sensory systems. The sensing unit 200 may also further comprise other sensory systems, including sensors for telematics and infotainment. The sensing unit 200 may have sensors located in different locations about the vehicle 110 or in one central location, such as near a vehicle's rear view mirror 206.

The sensing unit 200 may use its plurality of sensors to monitor and scan an environment 104 to identify real-world targets 106. Importantly, sensing unit 200 may be configured to sense a given target's position. A target's sensed position may be forwarded to the graphics unit 300 as a target position input. A target's position input may represent the precise location or place of a particular target 106 relative to the FCM 202 or another desired location within the vehicle 110. The target position input may also be a predicted target position input, as will be described later in the disclosure. The target position input may be forwarded from the sensing unit 200 to the graphics unit 300 in coordinates, such as Cartesian or Spherical. A target 106 may also have a particular indication associated with it, as well as an associated alert status. A target indication may be an identification or classification of a given target 106. For example, a target indication could be a pedestrian crossing the street, a nearby vehicle swerving, a lane marking, LDW, FCA, TSM, et cetera. A target indication may be useful to an operator in that a particular virtual indicator or signal may be projected within the operator's FOV based on the target indication. For instance, if the target 106 is a lane, the sensing unit 200 would recognize that the target 106 is a lane, and would highlight the lane with a lane marking indicator. The sensing unit 200 may also provide the alert status of a particular target indication. For instance, for an FCA target indication, there could be three levels of alert status, including: close, medium, and far. Virtual images for an FCA target indication could have certain colors associated with the target indication based on the alert status. For example, a "far" alert status could be designated with a yellow FCA indicator, a "medium" alert status could be designated with an orange FCA indicator, and a "close" alert status could be designated with a red FCA indicator.

As illustrated in FIG. 2, sensing unit 200 may be capable of sensing multiple targets 106 simultaneously. Take for example the following situation: an operator driving a vehicle 110 is approaching an intersection and the vehicle GPS has calculated that the quickest way to the desired destination is to turn left at the upcoming intersection. A number of targets 106 could be highlighted by the AR system 100. Target 1 could be a left turn indication. The AR system 100 could highlight the left turn lane and project an arrow within the operator's FOV designating that a left turn should be made. Target 2 could be an indication instructing that there is a four-way stop sign at the intersection, and the stop sign could be highlighted. Target 3 could be an indication that a biker is swerving from the right lane into the left turn lane just in front of the operator's vehicle 110; the biker could be highlighted. An alert status for the biker could also be presented to the operator, such as a red flashing outline of the biker's body indicating that a collision with the biker may be imminent. Any number of Targets N may be tracked by sensing unit 200. AR system 100 may be configured to prioritize certain targets 106, as highlighting too many targets 106 may decrease an AR system's effectiveness. Returning to the example above, if Target 3 (a biker swerving in front of the vehicle 110) is sensed, the AR system 100 may recognize the importance of eliminating the highlighting of Targets 1 and 2 and may only highlight Target 3 so that the driver immediately recognizes the immediate danger.

Referring to FIGS. 1 and 2, in addition to sensory units designed to monitor and scan the environment 104 external to a vehicle 110, the sensing unit 200 may also include sensory units that monitor the interior of the vehicle 110. One such sensory unit is a tracking camera 204. The tracking camera 204 may capture eye position and/or head position, and may report the location of the operator's eyes and/or head to the graphics unit 300. FIG. 1 depicts an exemplary tracking camera 204 capturing an operator's eye position. The position of the operator's eyes may be given in Cartesian or Spherical coordinates, for example. It is important to note that the AR system 100 may be operable with either an eye tracking system or a head tracking system. It may be advantageous to have the tracking camera 204 track the center of the driver's eyes or a center position on a driver's head.

Figure 3:
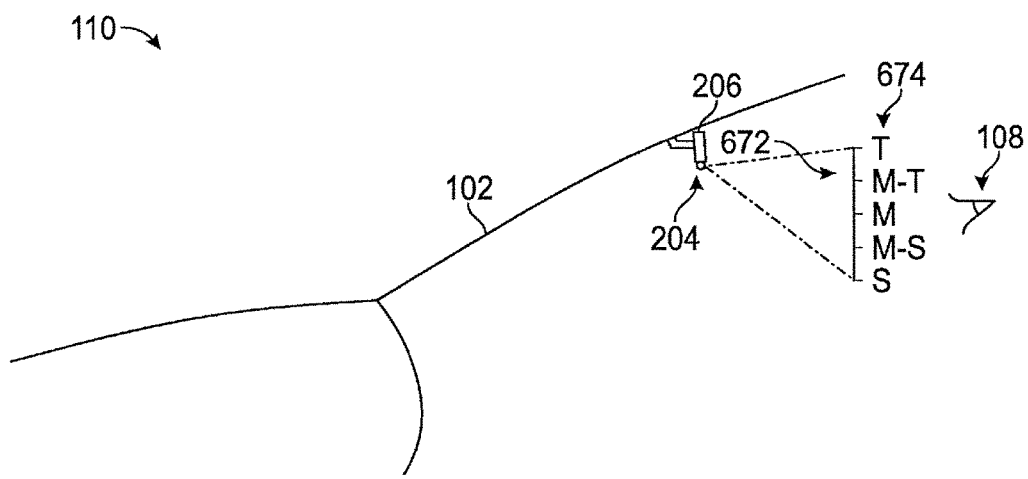
FIG. 3 shows a side elevation view of a tracking camera mounted within a vehicle.
Figure 4:
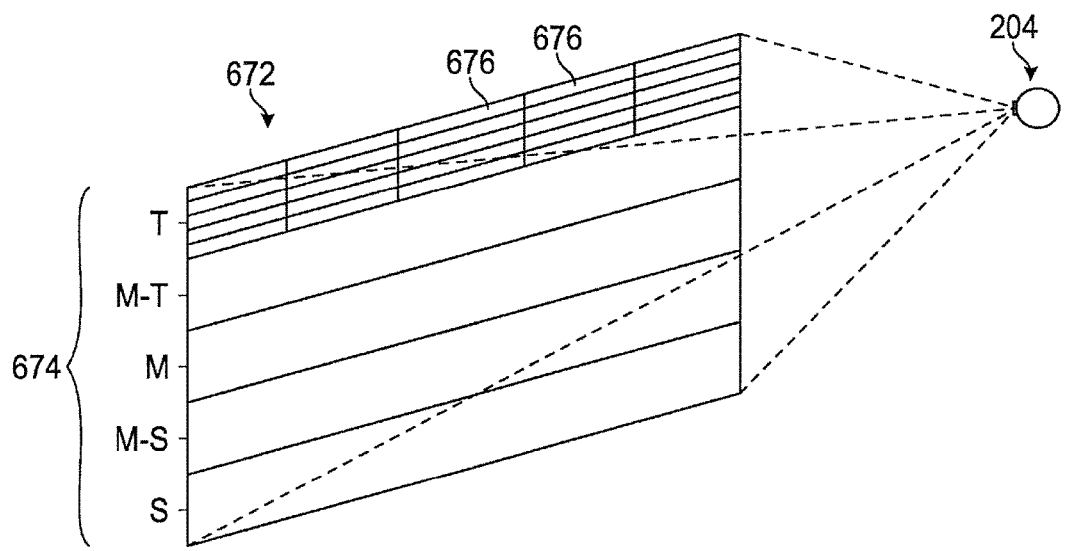
FIG. 4 is a perspective view of an exemplary operator movement box.

Referring now to FIG. 3, a side elevation view of a tracking camera 204 mounted within a vehicle 110 is shown. The tracking camera 204 may be mounted on a rear view mirror 206, or in its vicinity; other mounting locations are also possible. The tracking camera 204 may be configured to track eye and/or head movement within an operator movement box 672. Generally, it is preferred that the tracking camera 204 be configured to capture a wide range of head and/or eye movement such that a large percentile of operators may be accommodated. For instance, a tracking camera 204 may be configured to track eye boxes 674 of tall T, medium-tall M-T, medium M, medium-short M-S, and short drivers S, as shown in FIGS. 3 and 4. As shown in FIG. 4, each eye box 674 may contain a number of driver eye positions 676.

Capturing lateral eye and/or head movement is also critical. For example, if a driver moves his or her head to the right to gain a better perspective of a target 106 to the left of the vehicle 110, the tracking camera 204 may be configured to capture the head and/or eye movement to the right. Capturing driver head and/or eye movement is important in that the driver's viewing perspective is an important consideration in an AR system 100. If the driver's viewing perspective is unknown, unintended real-world objects may be overlaid with virtual images, which may have the effect of decreasing the accuracy of the driver's native senses. This will be described in greater detail later in the disclosure.

Referring again to FIGS. 1 and 2, the various sensing elements of the sensing unit 200 may be in communication with a vehicle bus (not shown) or like hardware to interconnect the various sensing elements to ensure communication between them. A vehicle bus or switch may provide a communication link between the sensing elements of the sensing unit 200 and the graphics unit 300 via a network, such as Controller Area Network (CAN), Ethernet, Media Oriented Systems Transport (MOST), or FPD-Link, for example. Wireless networks are also contemplated. The communication link between the sensing unit 200 and the graphics unit 300 may include multiple network types, such as both CAN and wireless. As shown in FIG. 2, target position inputs and other sensory inputs, such as an eye position input, may be forwarded from the sensing unit 200 to the graphics unit 300 via a network. Moreover, sensing unit 200 may include multiple vehicle bus or like hardware. For instance, there may be a CAN bus for engine information and a CAN bus for infotainment, telematics, et cetera.

Registration, or algorithm processing, is performed to determine characteristics of a sensed real-world target 106. Essentially, registration is performed to turn raw sensory data into useful information, such as determining what the target is, where it is, and the condition of the target (i.e., a target's position relative to the vehicle 110, its indication, and its alert status, for example). Registration may also be used to determine a target's 106 predicted position, as will be described in greater detail later in the disclosure.

As noted above, registration may be performed at any number of locations/hardware, including in the sensing unit 200 or internally in the graphics unit 300. Registration may also take place in a centralized module, for example. In one embodiment, an AR system 100 may be a centralized system. In the centralized system, the Sense step may be performed by the sensing unit 200. The steps of Register and Render may take place at a centralized module, which may be a centralized graphics processor, for example. The Display step may be performed at the display unit 400. This system may be advantageous in that it may require fewer materials, such as less silicon, than other possible configurations of an AR system 100. In another embodiment, an AR system 100 may be a point-to-point system. In the point-to-point system, the steps of Sense and Register may take place in the sensing unit 200, and the steps of Render and Display may take place in display unit 400 (where the graphics unit 300 and alignment system 500 are integral to the display unit 400). In this system, the data transferred from the sensing unit 200 to the display unit 400 (or the graphics unit 300 of the display unit 400) would preferably contain only processed information that is useful, instead of high bandwidth raw video. This AR system 100 arrangement may reduce system latency.

Generally, the graphics unit 300 processes the data and information forwarded to it by the sensing unit 200, as well as feedback sent from the display unit 400, and then generates a graphic output to be projected by the display unit 400. Effectively, the graphics unit 300 performs the Render step of the AR system 100. Render or Rendering as that term is used herein may encompasses the entire process that takes place in a graphics unit 300, including receiving and processing various inputs, generating a graphic, and image warping.

In an AR system 100, overlaying a real-world target 106 with a graphic image with a high degree of accuracy is critical. A superimposed image that is off center or overlaying the incorrect real-world object may decrease an operator's native senses. Establishing the degree of accuracy required to enhance an operator's perception depends largely on the application, but generally the accuracy of an AR HUD system 100 need not be greater than about 0.016 degrees (1 arc minute), which is commonly understood to be about the resolving power of the human eye. Total position errors over about 1 degree (60 arc minute) are considered unacceptable for AR systems 100. Position errors below about 0.5 degrees (30 arc minute) can generally be considered acceptable.

To obtain a high degree of accuracy, the graphics unit 300 comprises an alignment system 500 that applies corrections and predictive corrections in real time in both graphics generation and image warping such that the generated virtual images are correctly aligned with their intended real-world targets 106 within acceptable levels of distortion. As explained above, in AR systems 100 it is imperative that images be positioned and undistorted with high accuracy such that the accuracy of an operator's native senses is not detrimentally affected to a degree that would affect the decision-making ability of the operator for a particular use case. To produce accurately aligned virtual images that have acceptable levels of distortion, the alignment system 500 takes into account a number of error factors 600 (FIG. 6) that contribute to misalignment and distortion of graphics, and then makes the necessary corrections and predictive corrections.

Figure 6:
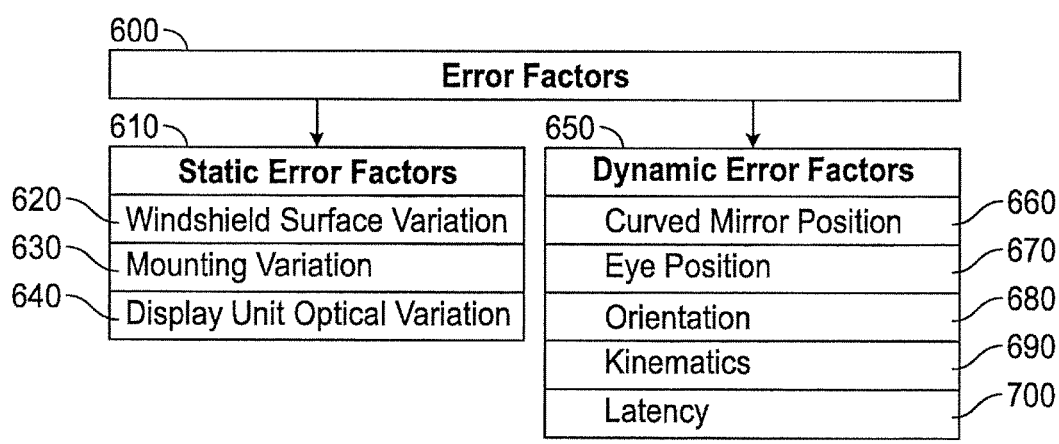
FIG. 6 shows a table listing a number of static error factors and dynamic error factors.

Referring now to FIG. 6, the error factors 600 may be categorized into two subgroups: the static error factors 610 and the dynamic error factors 650. The alignment system 500 may account for and correct the following static error factors 610: windshield surface variation 620, mounting variation 630, and display unit optical variation 640. Other static error factors 610 are also possible, especially those that may affect the optical systems of the AR system 100. The alignment system 500 may also account for and correct the following dynamic error factors 650: curved mirror position 660, eye position 670, vehicle orientation 680, kinematics 690, and latency 700. Other dynamic error factors 650 are also possible, including vehicle seat translation (forward and backward adjustments), vehicle seat back reclining movement, et cetera. Each error factor 600 will be discussed in more detail later in the disclosure.

Referring again to FIG. 2, the alignment system 500 may comprise a graphics processor 501 and a warping processor 502. The graphics processor 501 may be a System-On-Chip (SoC) i.MX6 processor manufactured by Freescale Semiconductor Inc. and the warping processor 502 may be a graphics board WD3 board, for example. In one embodiment, the graphics processor 501 and the warping processor 502 may be separate processors. Alternatively, in another embodiment, the graphics processor 501 and warping processor 502 may be combined into one processor. The graphics processor 501 receives a target position input from the sensing unit 200, and considering a number of dynamic error factor inputs in real time, translates the target's real-time coordinates into pixel coordinates. The pixel coordinates are then used by the graphics unit 300 to create a graphic output. After exiting the graphics processor 501, the graphic output is sent to the warping processor 502.

The warping processor 502 may dynamically move pixels to correct for image distortion (i.e., the warping processor 502 uses image warping to reverse distortion) caused by dynamic error factors 650 using a number of predistortion methods, including but not limited to using a predicted correction technique and/or a calibration technique. The warping processor 502 may also correct for distortion caused by a plurality of static error factors 610. Moreover, the warping processor 502 may also be configured to account for image deflection, or misalignment of a virtual image caused by the period of time required to render a graphic (i.e., latency 700). In other words, as a graphic is being rendered, a target 106 may be moving too quickly for the AR system 100 to render a graphic output that is properly aligned with the target 106. When a target 106 is moving too quickly, the warping processor 502 may correct for the image deflection by realigning the image onto the real-world target 106. Thus, the warping processor 502 may also make alignment adjustments in addition to correcting for distortion, as distortion is a form of misalignment, as noted previously. After the warping processor 502 has corrected for image distortion and image deflection, the alignment system 500, and more broadly the graphics unit 300, a final graphic output is ready to be projected by the display unit 400.

The display unit 400 takes the final graphic output, which has been corrected for misalignment and distortion by the alignment system 500, and projects an image onto an optical element. In FIG. 1, the optical element is a windshield 102. The rays projected by the display unit 400 are shown reflecting off of the windshield 102 toward the operator's eyes 108. As the windshield 102 has reflective properties, the reflected images create a virtual image on a virtual display plane 422 at an image distance from the windshield 102. The AR system 100 may be configured to have the virtual image overlay or highlight a real-world target 106; thus, an operator's reality may be augmented.

Figure 5:
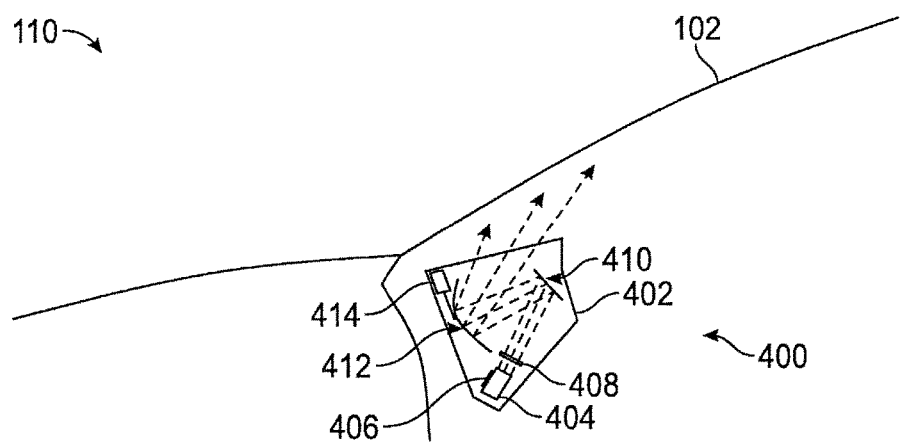
FIG. 5 depicts an exemplary display unit.

With reference to FIG. 5, an exemplary display unit 400 is illustrated. The display unit 400 may be a heads-up display (HUD) 402 as it is shown in FIG. 5. However, the display unit 400 may be any unit capable of displaying images within an operator's FOV. It is important to note that the graphics unit 300 may be a standalone centralized unit, or alternatively, the graphics unit 300 may be integral with the display unit 400, for example.

HUD 402 may comprise a printed circuit board (PCB) 406. The PCB 406 may have a processing unit configured to receive final graphic output signals from graphics unit 300. In another embodiment, the graphics unit 300 may communicate directly with a picture generation unit 404 (PGU) that may operably project images onto a windshield 102 such that a virtual image is rendered within an operator's FOV. PGU 404 may comprise an LED light or laser source that illuminates an image screen 408, such as a Vacuum Florescent Display (VFD), Liquid Crystal Display (LCD) panel, Digital Light Projector (DLP) (a/k/a DMD) and an associated screen, or MEMS and an associated screen to project a given image. Depending on a given HUD's packaging and configuration, projected images may be reflected a number of times by fold mirrors 410. Fold mirrors 410 may be any shape, such as planar or aspherical, for example. A concave mirror, or more generally a curved mirror 412, may reflect and focus the light received from the fold mirrors 410 onto an optical combiner element, such as a windshield 102. The curved mirror 412 may be rotatable to account for various driver height percentiles. To rotate the curved mirror 412, a stepper motor 414 may be provided. The stepper motor 414 may comprise an encoder or other type of positioning sensor to track the position of the curved mirror relative to a reference point. After receiving the reflected image from the curved mirror 412, the combiner element may partially reflect the projected image toward an operator, effectively allowing the operator to see a virtual image. The virtual image will appear to be at an image distance, or a distance from the surface of the windshield 102 to the virtual image. The AR system 100 may be configured to adjust the image distance. It will be appreciated that other optical and electronic elements may be included in a given HUD system, and that other arrangements and configurations are possible.

To summarize the overall AR system 100, a sensing unit 200 scans the environment 104 for targets 106, registers the information, and then may forward target position inputs, among other inputs, to the graphics unit 300 for processing. An alignment system 500, considering various error factor inputs in real time, translates the target position input into useable pixel coordinates, or a pixel position, and corrects for image distortion and deflection. The final graphic output is then received by a display unit 400 that projects a given virtual image onto a virtual display plane with correct positioning and acceptable distortion. The operator's reality may thereby be enhanced by the AR system 100.

Before disclosing the alignment system 500 in greater detail, a number of error factors 600 will now herein be described. A number of static error factors 610 will be discussed first, and then a number of dynamic error factors 650 will be subsequently addressed.

Static Error Factors 610

Windshield Surface Variation 620

Windshield surface variation 620, that is, the geometric variation of a windshield surface from one vehicle to the next, is an error factor 600 that the alignment system 500 may take into consideration. Even with vast improvements in manufacturing processes of windshields, windshield surface variation continues to range between about +/−1 mm from the master design. Meaning, the tool shape deviation over the area of the windshield used to reflect HUD rays, which is commonly called a HUD patch, may vary greatly from vehicle to vehicle. This surface variance may be acceptable for standard HUDs where an operator's reality is not augmented, but for AR HUD systems and AR systems in general, this is an unacceptable range of variation.

Figure 7:
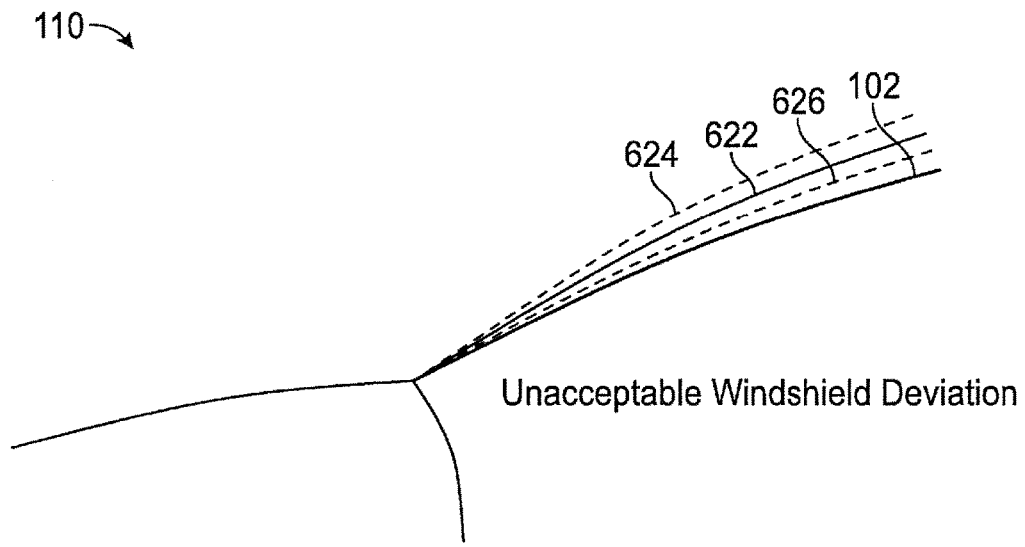
FIG. 7 shows an exemplary windshield deviating from its master design.

With reference to FIG. 7, a side elevation view of a vehicle 110 is shown. The windshield's master design 622 is shown with a solid line. The dotted lines represent the upper and lower limits 624, 626 of an acceptable range of deviation from the master design 622 (the limits are greatly exaggerated for illustrative purposes). Thus far, as noted above, windshields 102 have not been produced consistently within this acceptable tolerance range. Any deviation from the master design 622 may cause image misalignment and distortion, because a deviation in windshield surface may change the radius of curvature of a windshield, effectively changing the optical systems of the AR system 100. This effect will be described in greater detail later in the disclosure. A given windshield 102 that falls outside of the acceptable range of deviation from the master design 622, as shown in FIG. 7, may cause more significant changes to the optical system of the AR system 100, thus leading to greater image misalignment and distortion.

Moreover, the larger the HUD patch, the larger the potential deviation from the master design 622, as the same tolerance is harder to hold over a larger area. This fact may effectively increase the position error of a projected virtual image, among other negative effects.

Mounting Variation 630

Not only is there windshield surface variation from windshield to windshield, there may be windshield mounting variation and display unit mounting variation from vehicle to vehicle. The vehicle layout in terms of tolerance stack up is fundamentally not designed to be a complex projector mount. The display unit 400 and the windshield 102 together form a compound optical system making the physical orientation and distance between them important. The display unit/windshield relationship is much like a common telescope that uses two lenses, one eye piece lens and one objective lens. As the telescope is adjusted, the optical properties of the system change merely by adjusting the respective distances between the lenses. The same concept applies to the display unit/windshield relationship. Due to mounting variation, the display unit 400 and windshield 102 may be varying distances from one another. Accordingly, mounting variation 630 is a static error factor 610 that the alignment system 500 may take into account.

Figure 8:
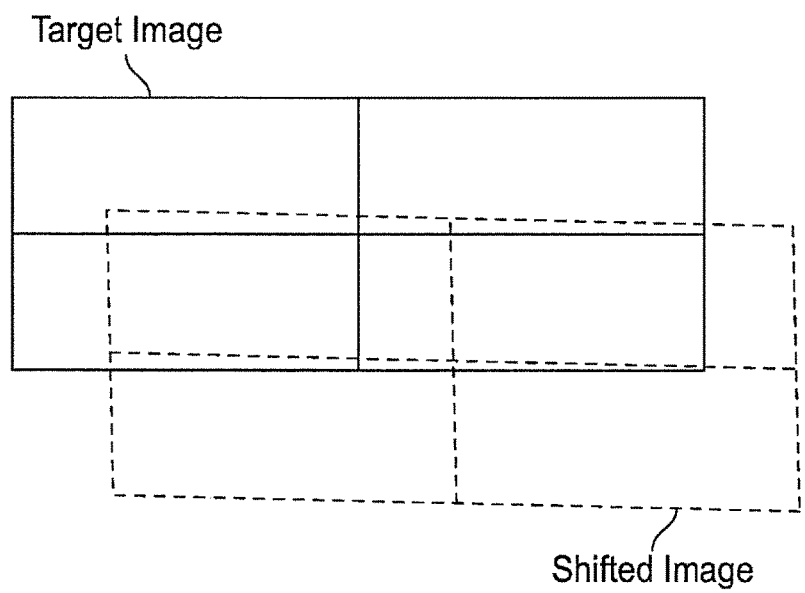
FIG. 8 illustrates the effect of mounting variation on a projected image.

Tolerance stack-up analyses, and more specifically worst case analyses, have shown that display unit mounting error margins (variations) may be over one degree. FIG. 8 shows the results of one such analysis where the display unit mounting error caused an error of more than one degree, which is considerable. This margin of error is not acceptable for AR systems 100. As previously discussed, the resolving power of the human eye is approximately 0.016 degrees (1 arc minute). Thus, an error margin of one degree would be very noticeable to an operator, and accordingly, this error factor 600 may be taken into consideration by the alignment system 500.

Display Unit Optical Variation 640

Display unit optical variation 640 from display unit to display unit are generally low, but not negligible in terms of augmented reality HUD image position. This error factor 600 is associated with mirror surface quality and mirror alignment position. These variations (collectively display unit optical variation 640) are considered separate from the mounting variation 630 error factor because even if the windshield 102 and display unit 400 could theoretically be mounted the same distance apart from one another and with the same orientation with respect to one another from vehicle to vehicle, the surface quality of the mirrors (e.g., the fold mirrors 410 or curved mirror 412) and the positioning of the internal mirrors of a display unit 400 could still cause misalignment of an image with respect to its intended real-world target 106.

Figure 9:
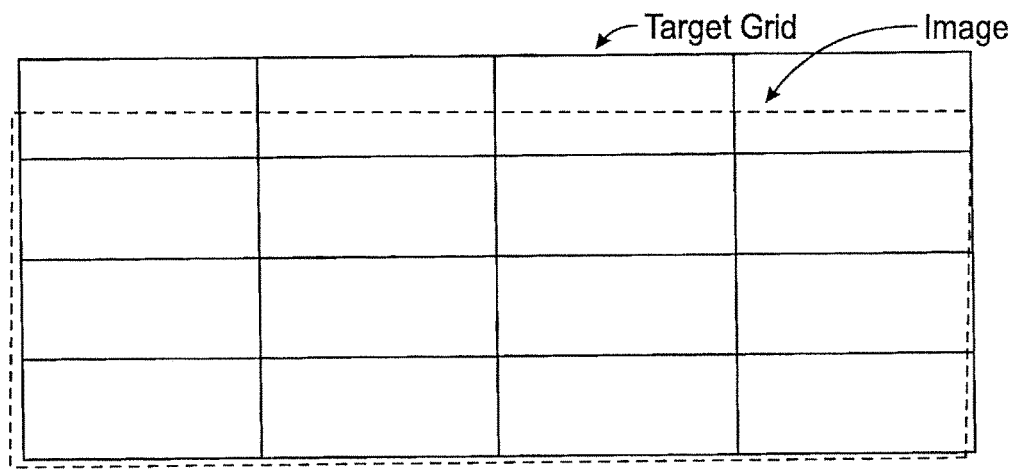
FIG. 9 illustrates the effect of display unit optical variation on a projected image.
Figure 10:
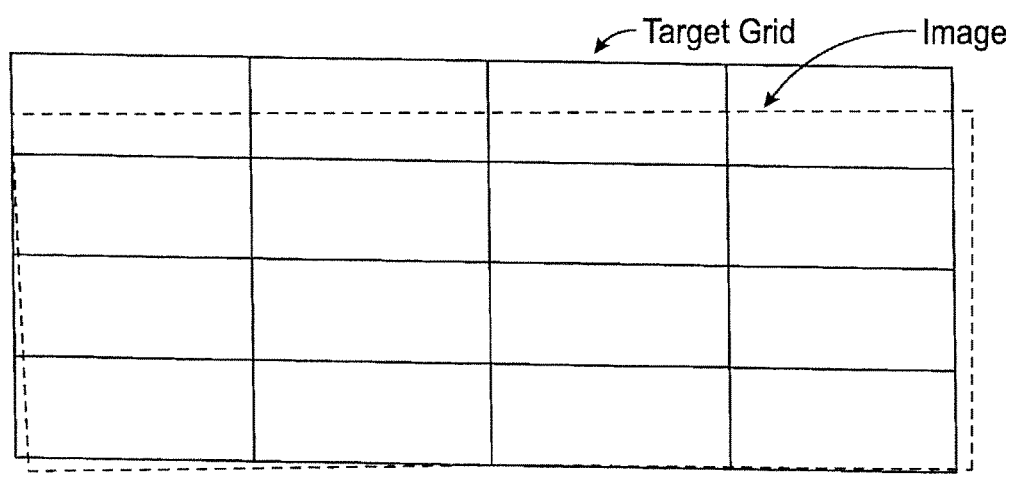
FIG. 10 illustrates another sample of the effect of display unit optical variation on a projected image.

Referring now to FIGS. 9 and 10, the figures show a comparison of HUD images produced at the center of a driver's eye box for two display units 400 that have projected images using the same AR system, but with different mirror surface quality and internal display unit mirror positioning. The projected image shown in FIG. 9 shows low but not negligible distortion with respect to the target grid, while the image shown in FIG. 10 shows different, non-negligible distortion with respect to the target grid. As is evident from the figures, mirror surface quality and mirror alignment variation contribute to image misalignment/distortion, and thus, display unit optical variation 640 is an error factor 600 that may be considered by the alignment system 500.

Dynamic Error Factors 650

Curved Mirror Position 660

Curved mirror position 660 is one of the dynamic error factors 650 that may be considered by alignment system 500. A change in curved mirror position 660 creates errors in two ways: (1) curved mirror position change causes misalignment of projected virtual images with respect to their intended real-world targets, and (2) a change in curved mirror position may change the optical systems of the AR system 100, causing distortion.

First, a change in curved mirror position 660 may cause misalignment. As noted previously, display unit 400 may comprise a rotatable or adjustable curved mirror 412, which may be a rotatable or adjustable concave mirror for example (see FIG. 5). When a driver settles into a driving position in a vehicle 110, a tracking camera 204 (or other capable sensor) may determine a driver's height, and then may communicate the height input to the display unit 400 such that the orientation of the curved mirror 412 may be appropriately adjusted. Generally, the orientation of a curved mirror 412 need only be selected and adjusted once before driving commences, but it is contemplated that a curved mirror 412 may be configured to move dynamically during driving operations.

As the orientation of the curved mirror 412 changes, misalignment and distortion of a projected virtual image may occur. Adjusting or rotating the curved mirror 412 to accommodate different driver heights forces the virtual image location to move vertically up or down, causing misalignment. Moreover, when the curved mirror 412 is adjusted, optical elements of the display unit 400 are altered, causing distortion and further misalignment of projected virtual images.

Despite the fact that a rotatable curved mirror 412 may cause misalignment and image distortion, a rotatable curve mirror 412 may be the only practical choice for many applications. Large curved mirrors configured to accommodate all driver heights may reduce the need for an adjustable curved mirror 412; but, due to packaging constraints and other practical considerations, such as weight factors, curved mirror size may be limited. Thus, a rotatable or adjustable curved mirror 412 may be necessary for an AR system 100 to adapt to the height of a particular operator.

Figure 11:
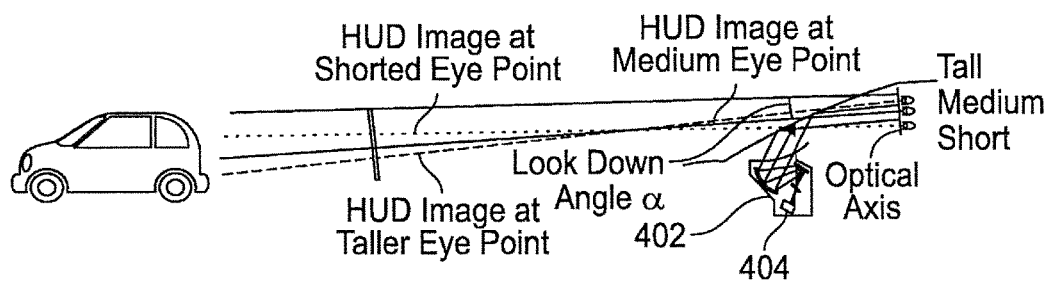
FIG. 11 is a side view illustrating the display unit image position shift at a tall operator eye point, a medium operator eye point, and a short operator eye point.

Referring now to FIG. 11, an illustration of how varying driver heights may affect image position is shown. In this example, three eye point references are shown: short S, medium M, and tall T, which correspond to short, medium, and tall drivers, respectively. As illustrated, the look-down angle α varies for different driver heights. The look-down angle α is the angle an operator looks down to see a virtual image with respect to the operator's visual horizon, or a horizon normal to the optical axis. In this example, for the short driver, where there is an eye point shift of −150 mm downward from the medium height reference point, the look-down angle α is 0 degrees. For the medium height driver, the look-down angle α is 5.0 degree. For the taller driver, where there is an eye point shift of 150 mm upward from the medium height reference point, the look-down angle α is 10 degrees. As is evident from the example, the taller the driver, the greater the look-down angle α.

Figure 12:
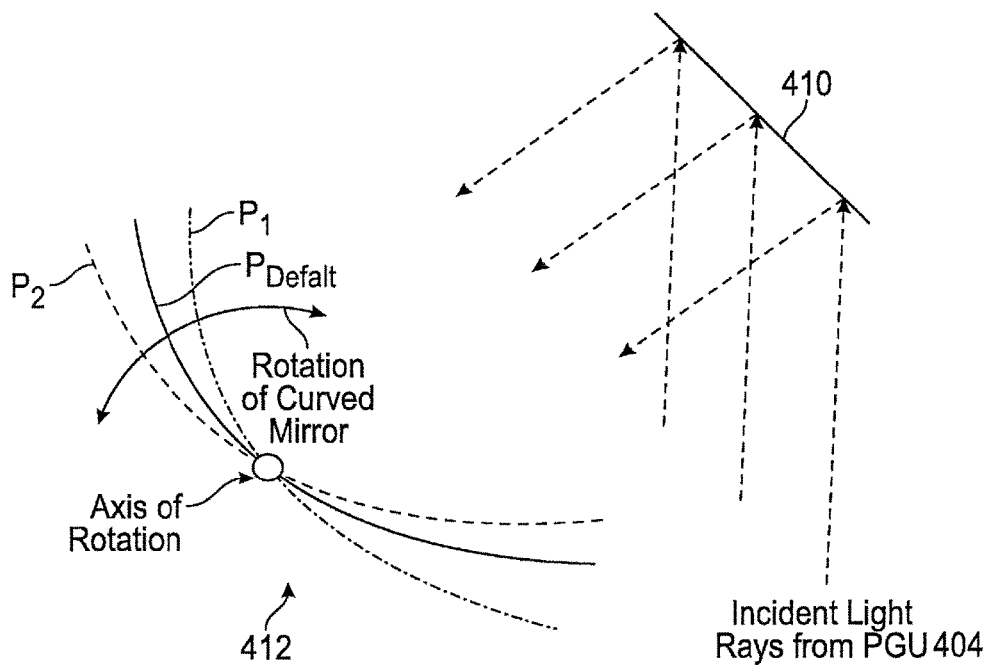
FIG. 12 shows an exemplary curved mirror and how it may rotate to accommodate differing operator heights.

To accommodate these varying look-down angles α, the curved mirror 412 rotates. FIG. 12 illustrates how a curved mirror 412 may rotate with respect to an axis of rotation, which may be a lateral axis. Depending on the driver's height, the curved mirror 412 may be configured to rotate to a predetermined position. For example, when a driver enters a car, the curved mirror 412 may be set to a default position $P_{Default}$. After the driver has positioned him or herself into a driving position, the curved mirror 412 may rotate to a predetermined position, such as first position $P_1$ or second position $P_2$, depending on the driver's height. As FIG. 12 illustrates, when the curved mirror's position changes, the incident light rays projected by a PGU 404 and reflected by a fold mirror 410 will hit the surface of the curved mirror 412 at different points and incident angles, thereby causing the curved mirror 412 to reflect the light rays to differing intersection points and angles on a windshield.

Figure 13:
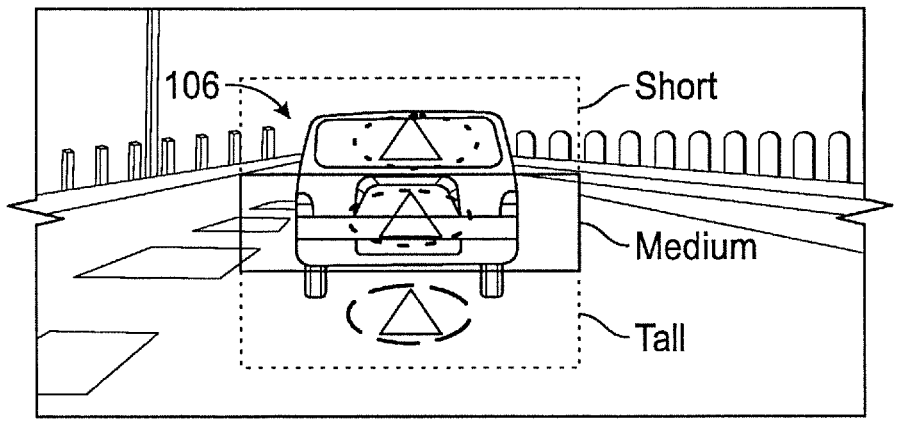
FIG. 13 illustrates display unit image position shift at a tall operator eye point, a medium operator eye point, and a short operator eye point from a driver's perspective.

FIG. 13 is a perspective view from a driver's seat showing how a virtual image will appear at differing driver heights. As the curved mirror 412 moves to accommodate the different driver heights, the virtual image moves, changing the targets 106 that the virtual image can overlay. In this example, the target 106, or in this case a vehicle, is positioned a distance ahead within the driver's FOV. The virtual image for the tall driver is shifted downward from the medium driver reference point and the virtual image is overlaid below the target vehicle. The virtual image for the short driver is shifted upward from the medium driver reference point, and although the virtual image is still overlaying the vehicle in this example, it is not projected in the desired position. The virtual image for the medium driver is positioned correctly with respect to the vehicle. The vertical (or elevation) misalignment caused by a rotatable curved mirror is evident. Thus, the process of overlaying real-world targets 106 with projected virtual images to the resolution of a near infinite number of mirror positions adds detailed complexity to the alignment system.

Second, a change in curved mirror position may change the optical systems of the AR system, causing distortion. The points on the windshield at which projected light rays intersect the windshield may be thought of as a series of optical systems. When a curved mirror rotates, the optical systems of the AR system change because the incident light rays projected by the display unit intersect the windshield at different intersection points, which changes the reflection surface profile of the windshield, which in turn causes image distortion. Moreover, as the curved mirror changes position, an operator may perceive a change in a virtual image's distance and magnification, which will be perceived as image distortion.

Windshields may have complex surface profiles. They are generally not ideal spherical mirrors. However, for illustration purposes, an ideal spherical windshield with paraxial rays will be used to describe the interdependence of focal length f, object distance p, and image distance i (collectively "optical variables"), and these optical variables will be used to show how the optical systems may change when a curved mirror's position is altered. The relationships of the optical variables noted below in Equations 1-3 still generally follow for windshields having complex surface profiles, and are still relevant even if the Equations cannot be used to solve for a given optical variable in a windshield optical system of an AR system 100.

Figure 14:
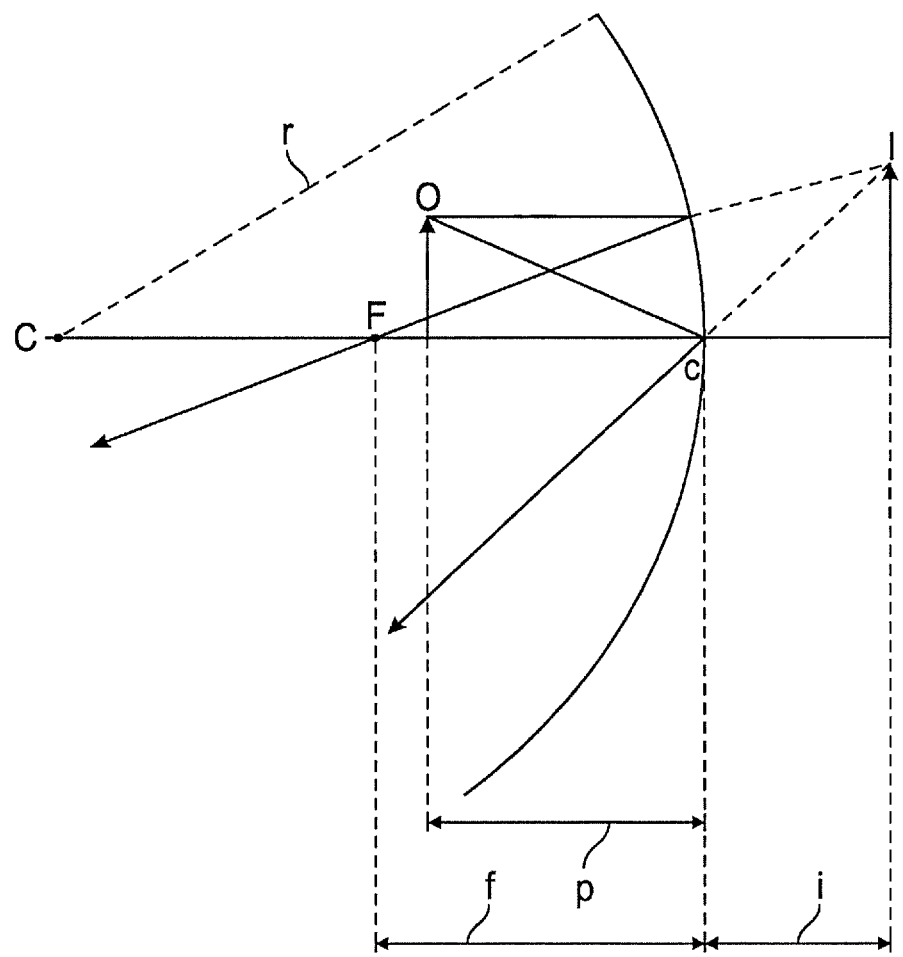
FIG. 14 illustrates the relationships between various optical variables as they apply to an exemplary spherical mirror.

With reference to FIG. 14, an ideal concave spherical mirror is depicted, which represents the optical element (i.e., the windshield) in this example. The spherical mirror has a center of curvature C (or the center of the sphere of which the mirror's surface is part) and a radius r. The mirror also has a Focal Point F, which is the focus point of the spherical mirror. Focal length f is the distance from the center of the mirror c to the Focal Point F. The object distance p is the distance from the mirror center c to the location of the object O, or the location of the source of the incident light rays in this case. The image distance i is the distance from the mirror center c to where an image I appears. Light rays are shown originating from the object O and projected toward the concave spherical mirror. The light rays are reflected off of the spherical mirror, and a resulting virtual image I appears.

Importantly, changing the object distance p or the focal length f changes the image distance i, as these optical variables have the following well-known relationship detailed in Equation 1 below, which is the mirror-lens equation:

$$\frac{1}{p} + \frac{1}{i} = \frac{1}{f} \qquad \text{Equation (1)}$$

When the image distance changes due to a change in the object distance p or a change in focal length f, an operator may perceive this as image distortion.

Moreover, as the image distance i and the object distance p are also related to the lateral magnification m of a given image, as noted by Equation 2 below, if either the image distance i or the object distance p changes, the lateral magnification m of a projected virtual image may be altered, causing further distortion. In short, when the object distance p changes, the lateral magnification m of a given image also changes.

$$m = -\frac{i}{p} \qquad \text{Equation (2)}$$

The concepts noted above will now be illustrated with reference to an AR system 100. A position change of the curved mirror corresponds to a change in object distance p. It follows then that a change in the object distance p will render a change in the image distance i, and an operator may perceive this change as image distortion. Moreover, as the curved mirror changes position, the lateral magnification m of the projected virtual image also changes. In short, as the curved mirror position changes (which corresponds to a change in object distance p), the image distance i and the image height of a projected virtual image also changes, which is perceived as image distortion by an operator. Accordingly, as the curved mirror changes position, the projected virtual image may have a different image distance and lateral magnification m.

As noted above, when a curved mirror rotates, the optical systems of the AR system change because the incident light rays projected by the display unit intersect the windshield at different intersection points, changing the reflection surface profile of the windshield. This causes further distortion as the incident light rays may reflect differently at different intersection points, because the windshield may have differing surface quality at a particular point, and that point may have different curvature.

Windshields generally do not have a uniform radius r. A windshield having a non-uniform radius may have sections with differing radii, denoted $r_1$, $r_2$, $r_3$, $r_n$ for example. As one of skill in the art will appreciate, for spherical mirrors, the focal length f is related to a given radius of curvature r by the following equation:

$$f = 1/2\ r \qquad \text{Equation (3)}$$

In the case where a mirror has a surface with a non-uniform radius, such as the case with many windshields, the focal length f changes when the radius r changes. For instance, where a windshield has a first section with a radius $r_1$ and a second section having a radius $r_2$, it is apparent that the focal length f will change, as demonstrated below.

$$f_1 = 1/2\ r_1$$

$$f_2 = 1/2\ r_2$$

When the focal length f changes, the image distance i may change, as these variables have the following well-known relationship detailed in Equation 1.

Accordingly, when the curved mirror changes position to accommodate differing driver heights, the incident light rays reflected off of the curved mirror intersect the windshield at different intersection points. The new intersection points may intersect the windshield at locations where the windshield has non-uniform curvature, and thus, the focal length f may change. This in turn causes the image distance to change. Hence, projected virtual images may appear at differing distances and magnifications when a curved mirror changes position, which causes image distortion.

Although Equations 1-3 were used for illustration purposes, they assume that an AR system comprises an ideal curved mirror with incident paraxial rays of not more than ten degrees from the optic axis. As this is generally not the case for AR systems (the optical elements are generally not ideal spherical mirrors and the incident light rays are generally not paraxial), an AR system might have more complex optical systems. This fact exacerbates the distortion caused by a change in curved mirror position 660.

Eye Position 670

Eye position 670 is one of the dynamic error factors 650 that may be considered by alignment system 500. Like curved mirror position 660 change, a change in eye position 670 creates errors in two ways: (1) eye position change causes misalignment of projected virtual images with respect to their intended real-world targets, and (2) a change in eye position may change the optical systems of the AR system, causing distortion. It should be noted that eye position/movement may be used interchangeably with head position/movement.

First, moving eye position may change the perceived alignment of a virtual image with respect to a real-world target; meaning, a projected image that properly overlays a target for one driver perspective may not properly overlay the same target at a different driver perspective. Drivers may move their heads in vertical, lateral, and fore/aft directions or a combination thereof (or in spherical terms, in elevation and/or azimuth directions), causing significant misalignment of a virtual image with respect to its intended real-world target.

Figure 15:
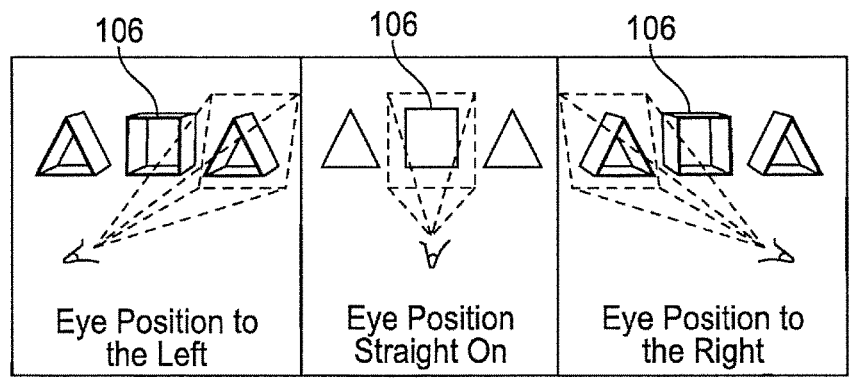
FIG. 15 illustrates how misalignment can occur due to lateral head and/or eye movement.

Referring now to FIG. 15, an illustration of how misalignment can occur due to lateral head and/or eye movement is shown. If a driver's eye position and perspective is "straight on" with an intended real-world target 106 (the rectangle), the target 106 may be correctly overlaid with a virtual image (shown by the dotted lines). However, if the driver moves his or her eye position laterally (i.e., to the left or right eye position), the HUD image may not be overlaying the intended real-world target 106 (the rectangle), but rather other objects in the environment (the triangles) will be overlaid with the virtual image. Overlaying an object that is not intended to be overlaid may have the effect of decreasing a driver's native senses. Similarly, vertical (or elevation) misalignment may occur if a driver moves his or her eye position upward or downward and the virtual image remained stationary.

Second, moving the driver's eye position changes the path back to the display unit 400, which changes the optical systems, primarily because the intersection points on the windshield are different and therefore the shape/surface profile of the windshield changes. These changes to the optical systems distort virtual images and cause misalignment, as detailed above in the curved mirror position section.

Figure 16:
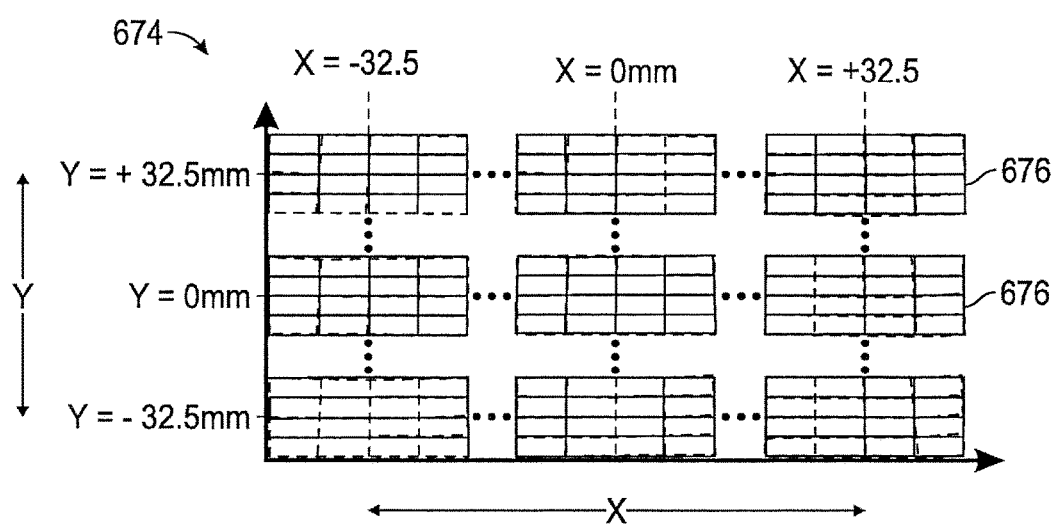
FIG. 16 displays the misalignment and distortion of an image caused by a driver's lateral and vertical head movement.

FIG. 16 displays an exemplary depiction of misalignment and distortion caused by a driver's lateral X and vertical Y eye and/or head movement. A given driver's eye box 674 is shown with a total of nine driver eye positions 676 (three rows and three columns). For each driver eye position 676, a master or target image is shown (solid lines). The actual projected images are shown with dotted lines. The chart illustrates that when a driver's eyes are positioned near center, or the origin (X=0 mm, Y=0 mm), misalignment and distortion are minimal. However, the further from center a driver's eye position is, for example at X=−32.5 mm, Y=32.5 mm from center, misalignment and distortion of the projected image with respect to the master image is unacceptable. As such, eye position 670 is an error factor that may be accounted for by the alignment system 500.

Vehicle Orientation 680

Vehicle orientation 680 is another dynamic error factor 650 that may be considered by the alignment system 500. While vehicle orientation 680 may contribute to changes in eye position 670, the orientation itself may be accounted for. It will be appreciated that the term "vehicle" in this context is used broadly to encompass other modes of transportation, including aircraft and watercrafts, and is not limited to automobiles. Vehicle could mean any means of transportation, including even a human being running or walking.

Vehicles 110, like any rigid body, may have their motion described in terms of Degrees of Freedom (DOF). That is, assuming a Cartesian coordinate system having three mutually perpendicular unit vectors (i.e., a vertical Y axis, a lateral X axis, and a fore/aft Z axis) as a reference frame, a vehicle 110 may have six DOF. The six DOF include rotational motion about the three axes (three DOF) and translational motion (three DOF) along the three axes.

Figure 17:
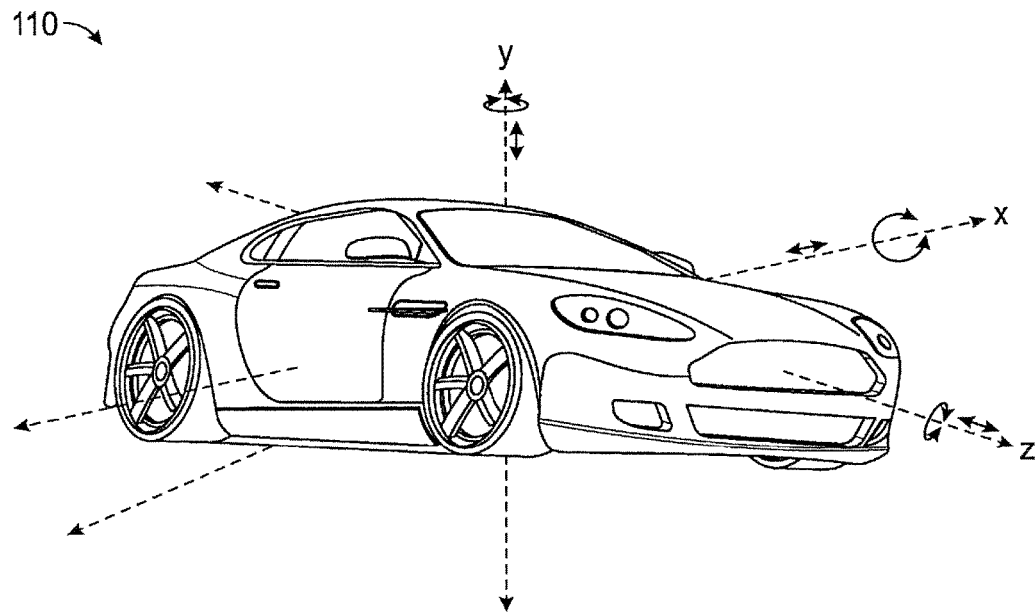
FIG. 17 illustrates an exemplary vehicle and its potential movement in six degrees of freedom.

In the context of an automobile, rotational motion about the three axes of rotation may occur in the following situations. If the automobile is braking, it may pitch, or tend to rotate about a lateral axis X. When in a turn, the automobile may roll (bank), or tend to rotate about a fore/aft axis Z. When skidding, fishtailing, or peeling out, the automobile may yaw, or tend to rotate about a vertical axis Y. Regarding translational motion, the automobile may translate along a fore/aft axis Z and a lateral axis X by moving forward, backwards, or turning. When an automobile travels over a bump, it may translate in a vertical direction along a vertical axis Y. In FIG. 17, a vehicle 110, or in this case an automobile, is depicted with reference to a lateral axis X, a vertical axis Y, and a fore/aft axis Z, and the six DOF about those axes are shown.

As a vehicle 110 may have six DOF, and sometimes fewer than six DOF, the orientation of the vehicle 110 may change continuously, and accordingly, it may cause image misalignment and distortion. To account for the image misalignment and distortion, the alignment system 500 may consider the vehicle orientation 680.

Kinematics 690/Latency 700

Kinematics 690 and latency 700 are dynamic error factors 650 that may be considered by the alignment system 500. These two error factors 600 are closely related and thus they will be addressed together. An alignment system 500 may utilize kinematics inputs 690 and latency inputs 700 to correct for image misalignment in the 3D graphics generation stage and to correct for image deflection in the 2D warping stage. To correct for the named errors, the kinematics and latency inputs 690, 700 may be used to make predictive corrections as to where a target 106 might be in relation to a reference point (e.g., a vehicle's FCM 202) at a predetermined time in the future. The manner in which an alignment system 500 may use kinematics and latency inputs 690, 700 to make predictive corrections will be more fully discussed below.

System latency 700 may generally be expressed as the period of time it takes an AR system 100 to complete the Sense→Register→Render→Display process. Hence, latency inputs 700 may be forwarded to the alignment system 500 as time inputs. Tracking the system latency 700 of an AR system 100 at each stage of the process may be of importance, as each task may take a certain period of time to perform. Alignment system 500 may correct for system latency 700 at different stages, including while generating a graphic in the graphics processor 501, and then the warping processor 502 may further account for image deflection caused by system latency during the graphics generation stage, as noted above.

With respect to the graphics processor 501 correcting for system latency 700, it will be appreciated that the Sense and Register tasks may each take a certain period of time to be performed. Thus, when the graphics processor 501 receives various inputs, such as a target position input, some of the inputs may become outdated by the time the system fully senses and registers a particular target 106. Thus, in one embodiment, a time input may be received by the graphics processor 501 to allow for the graphics processor 501 to account for the latency 700 associated with the steps of sensing and registering (see FIG. 19). Thus, a target position input may be an actual position of a given target 106, or it may be a predicted target position.

With respect to the warping processor 502 correcting for system latency 700, it will be appreciated that the graphics generation process performed by the graphics processor 501 may take a certain period of time to be completed. Thus, inputs initially received by the graphics processor 501 may be further outdated by the time a graphic output is generated by the graphics processor 501. For example, a target 106 may have moved from its originally sensed position to a second position during the period of time it took the graphics processor 501 to generate a graphic. The distortion error caused by latency during graphics generation is deemed image deflection herein. In one embodiment, the time it takes the graphics processor 501 to generate a graphic may be tracked and forwarded to the warping processor 502 such that this information can be used to make predictive corrections. Additionally, the warping processor 502 may receive feedback on the latency period that it takes a final graphic output to be forwarded from the graphics unit 300 to the display unit 400, as well as the time it takes the final graphic output to be displayed by the display unit 400. To correct for image deflection, the warping processor 502 may have a plurality of image deflection warp maps 710 that allow for a last millisecond 2D adjustment of the graphic output.

Kinematics inputs 690 may also be of importance in making predictive corrections. As a vehicle 110 and a target 106 move in time relative to one another, the target's sensed position may become outdated or inaccurate due to system latency 700, as noted above. When a target's position relative to the vehicle 110 becomes outdated, a projected virtual image may be misaligned or distorted with respect to its intended target 106. Where an AR system 100 has non-negligible latency, if the dynamic error factors 650 of dynamics 690 and latency 700 are not taken into account, a projected virtual image may overlay where a target 106 was rather than the actual target 106.

The kinematics inputs 690 may be sensed by a number of sensory units, including speed sensors, steering wheel angle sensors, GPS, et cetera. Kinematics inputs 690 that may be tracked include a vehicle's speed and direction (i.e., the vehicle's velocity), a target's speed and direction (i.e., the target's velocity), and with this information, a relative velocity may be calculated. Accordingly, where the following inputs are known: a target's initial position, the relative velocity between a vehicle 110 and a target 106, and the latency 700 of the system; a target's position relative to the vehicle 110 may be predicted at a future predetermined time. A predetermined time might be after the Sense and Register steps, it might be after the Sense, Register, and Render steps, or after the entire Sense→Register→Render→Display process is completed, for example.

It is important to note that when referring to a target's predicted position, it is the relative position or change in relative position that is of importance, and not the target's absolute position. In other words, if a target 106 is a pedestrian crossing the street, it is the pedestrian's position relative to the vehicle 110 that is of importance.

Accordingly, kinematics and latency inputs 690, 700, in combination, may be used as tools to predict a change in a target's position such that a target's sensed position may be adjusted to reflect a predicted target position in the 3D graphics generation stage. Moreover, system latency 700 can further be tracked during the graphics generation stage to allow for the warping processor 502 to correct for any image deflection caused by latency during this period. A target's position may be predicted in the FCM 202 of the sensing unit 200, in the graphics unit 300, other processing modules, or a combination thereof.

Figure 18:
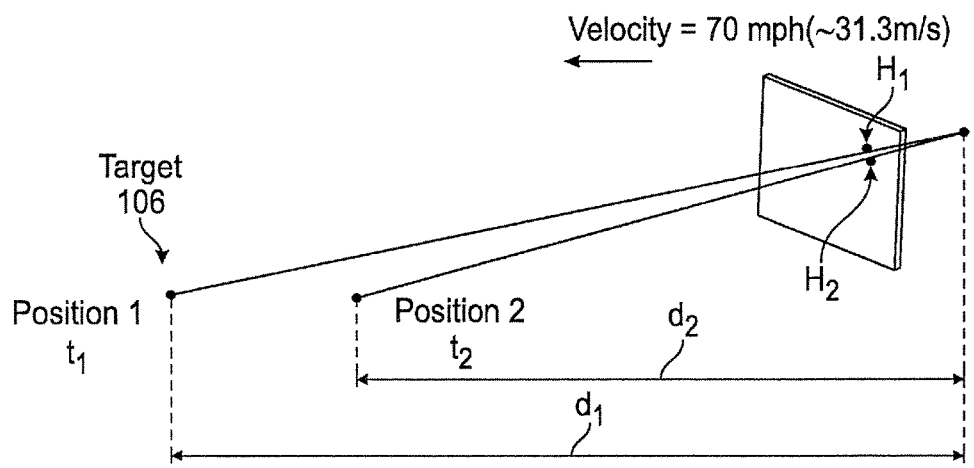
FIG. 18 shows a view of how system latency may affect a target position input.

Referring now to FIG. 18, consider an example of a driver traveling down a straight road in a vehicle 110 at a velocity of seventy (70) mph (~31 m/s). Suppose that at a time $t_1$=0 seconds a stationary target 106 is located at Position 1, which is a distance $d_1$ of twenty (20 meters) ahead of the vehicle 110. As noted above, the total system latency 700 can be expressed as the amount of time necessary for the entire Sense→Register→Render→Display process to take place. If the system has a total latency delay of time $t_2$=200 milliseconds, the target 106 is more than 6 meters closer to the vehicle 110 at Position 2 by the time the virtual graphic is displayed to overlay the target 106 at Position 1, as distance $d_2$=velocity (31.3 m/s)*$t_2$ (0.20 s)=6.26 meters. In this example, the resulting alignment error would be roughly 1.24 degrees. However, if the target's position was predicted to be at a distance $d_2$ from the vehicle 110 at a time $t_2$, the virtual image could properly overlay the target 106. Instead of projecting the virtual image on the virtual display plane 422 at Point $H_1$, the AR systems could project the virtual image on the virtual display plane 422 at Point As is evident from the example, determining the velocity of the vehicle 110 and the velocity of the target 106, or the relative velocity between them is of importance, as this information is vital in predicting a target's position relative to a vehicle 110 given an AR system's latency 700.

Target position predictions may be based on the assumption that if a target 106 and vehicle 110 are moving relative to one another, the inertia of the target 106 and/or vehicle 110 will keep moving at about the same relative velocity over a short period of time. A target 106 or vehicle 110 typically does not change its velocity drastically in 1/10th of one second, for example. Accordingly, a target's position may be predicted.

Alignment System

Figure 19:
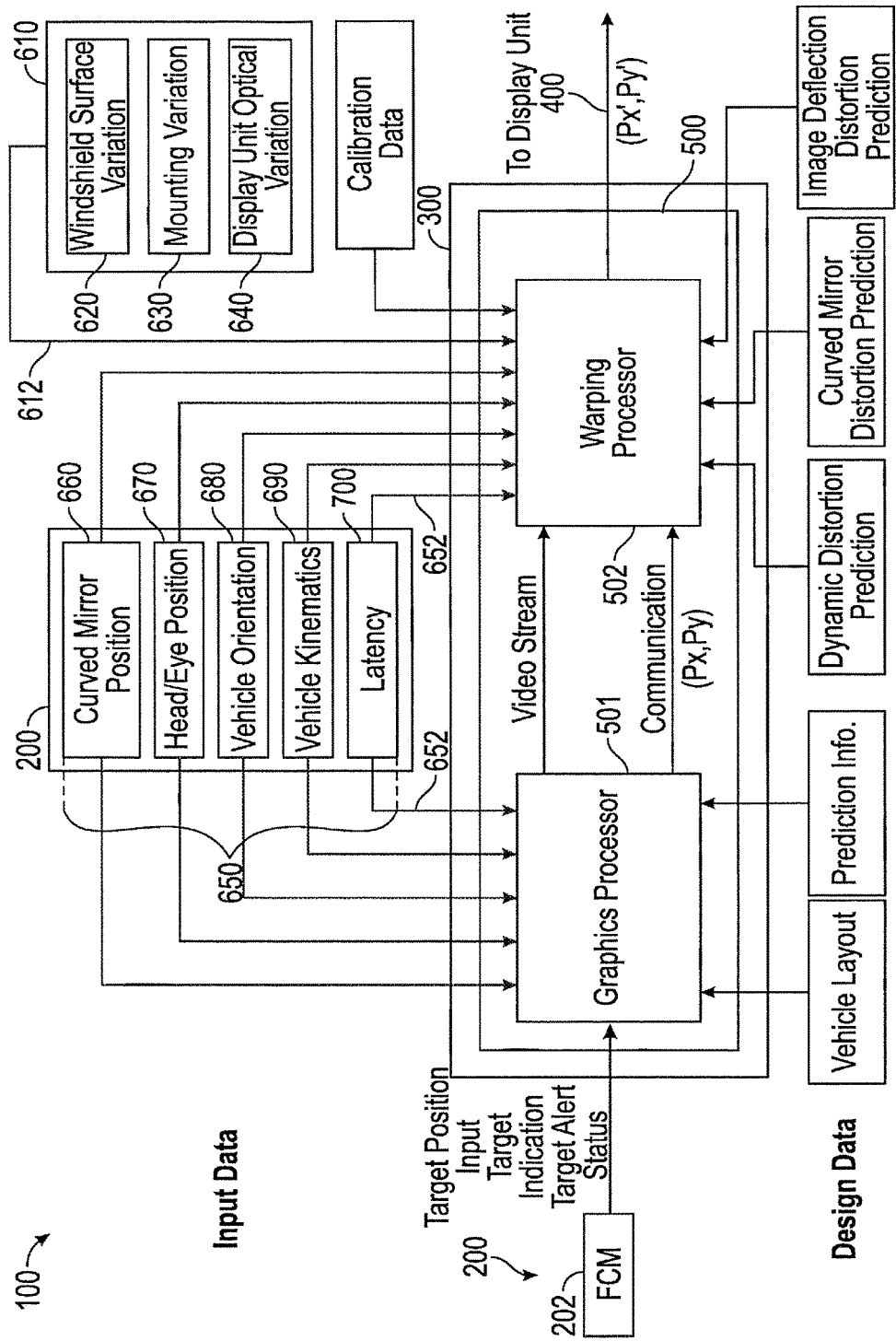
FIG. 19 illustrates a block diagram of an exemplary alignment system.

The alignment system 500 will now be described in detail. Referring now to FIG. 19, a block diagram of an exemplary alignment system 500 is illustrated. As noted previously, alignment system 500 may be housed within a graphics unit 300, and the alignment system 500 may comprise a graphics processor 501 and a warping processor 502. The graphics processor 501 may receive a target position input, utilize the target position input in combination with a number of dynamic error factor inputs 652 to translate the 3D inputs into 2D pixel coordinates, and then, a graphic output is generated in 2D pixel coordinates. The graphics processor 501 may also consider the target's indication and alert status to generate a particular graphic having a particular color scheme. The warping processor 502 then receives the graphic output from the graphics processor 501, and corrects for image distortion and image deflection. The warping processor 502 reverses image distortion to the graphic by correcting for a plurality of static and dynamic error factors 610, 650. The warping processor 502 may also correct for image deflection that is caused by system latency 700. The final graphic output is forwarded from the warping processor 502 to the display unit 400 such that a virtual image may ultimately be displayed to the driver.

The alignment system 500 will be discussed in two parts: first the graphics processor 501 will be discussed and then the warping processor 502 will be addressed.

Graphics Processor

As illustrated in FIG. 19, the alignment system 500 may receive a target position input from sensing unit 200. The target position input may be sent from the sensing unit 200 over a network, such as a CAN or Ethernet network, or a combination thereof. The graphics processor 501, or graphics generation processor, may also receive Input Data in the form of dynamic error factor inputs 652 based on any number of dynamic error factors 650. For instance, a mirror motor, such as a stepper motor 414 (not shown), may be used to determine the curved mirror position 660; a tracking camera 204 (not shown) may be used to determine the eye position 670 of the driver; an Inertial Measurement Unit (IMU) (not shown) may be used to determine the real time orientation of the vehicle based on the vehicle's orientation 680; speed sensors, steering angle sensors, and/or GPS (not shown) may be used to determine the kinematics 690 of the vehicle; and system latency 700 may be tracked by sensors and means known in the art. These various sensory units may send dynamic error factor inputs 652 to the alignment system 500 of the graphics unit 300.

Referring to FIG. 5, the curved mirror 412 of the display unit 400 may comprise a stepper motor 414 that may be configured to rotate the curved mirror 412 in order to accommodate various driver heights. The stepper motor 414 may include an encoder (not shown) or other capable sensor to "count" the position of the curved mirror 412. A count may denote the orientation of the curved mirror 412 by a series of integers, such as one, two, three, and so on. The count integers may each represent a predetermined rotational position of the curved mirror 412. For example, an integer count of "one" may represent that the curved mirror 412 has been rotated one degree with respect to an axis of rotation.

Referring again to FIG. 19, to track eye position 670, a tracking camera 204 (not shown in FIG. 19) or like sensor may sense and identify the eye position of an operator. The eye position may be input into the graphics processor 501 as 3D coordinates (x, y, z), for example. Data from the vehicle's orientation 680 may also be input into the graphics processor 501. An IMU may sense a vehicle's translational and rotational movements using known IMU sensing elements, such as triple axes accelerometers, gyroscopes, and magnetometers. In this manner, the vehicle's orientation may be sensed and captured such that it may be input into the graphics processor 501. Speed sensors, steering angle sensors, and/or GPS may be used to capture a vehicle's kinematics 690 such that the graphics processor 501 may receive a vehicle kinematics input 690.

As noted in FIG. 19, a time input (latency input) may also be input into the graphics processor 501. The time input is an input that tracks the time it takes a communication to go from the FCM 202 or other sensor of the sensing unit 200 to the graphics processor 501 of the alignment system 500 (i.e., the Sense and Register steps). If there is significant latency for communications traveling between the FCM 202 or other sensor and the graphics processor 501, image misalignment may be more severe if it is not accounted and corrected for, as a target's position may dynamically change relative to a vehicle during this latency period. Moreover, graphics processor 501 may utilize the time input in combination with the kinematics input 690 to predict vehicle and target position within a latency period. To illustrate, consider a vehicle in a sharp high-speed turn where the AR system 100 is attempting to highlight a group of bikers ahead. To overlay the bikers with a virtual graphic more accurately, the time input, the vehicle orientation input 680, and the vehicle kinematics input 690 may be considered to determine the speed, direction, and orientation of the vehicle with respect to the ground (in this case, the vehicle will be experiencing a banking or rolling action) and the targets relative position to the vehicle. These inputs may be used to predict the target's position relative to the vehicle within the latency period. In this manner, the alignment system 500 may overlay real-world targets more accurately even where a vehicle's kinematics and orientation are dynamically changing and where a target is dynamically changing its position relative to the vehicle.

Referring still to FIG. 19, the dynamic error factor inputs 652 associated with the curved mirror position 660, eye position 670, vehicle orientation 680, kinematics 690, and latency 700 error factors may be sent to the graphics processor 501 in either digital or analog form, among other possible forms. Then, Design Data inputs may convert these raw data dynamic error factor inputs 652 into useable form using a predetermined application-specific algorithm such that image position, size, and alignment and distortion correction information can be determined. Design Data may be based on a given model of vehicle, and not a specific vehicle.

In this embodiment, the Design Data inputs that corresponds with the dynamic error factor inputs 652 include Vehicle Layout and Prediction Information. The Vehicle Layout may include 3D locations of different objects of interest, including sensors, display location, driver head location, image location, et cetera. Vehicle Layout data may be combined with the raw data dynamic error factor inputs 652 such that the raw data can be used by the graphics processor 501. Prediction Information may be used to position a graphic image based on predicted corrections. For example, in considering the latency of the AR system 100 during the Sense and Register steps and the motion of a target relative to a vehicle comprising an AR system, Prediction Information may be used to look up or calculate the target's predicted position based on the latency and kinematics inputs; and accordingly, a virtual graphic image can be positioned based on this predicted position. In an alternative embodiment, the dynamic error factors inputs 652 may be input into the alignment system 500 in a readily useable form, without need for the use of the Design Data.

Referring now to FIG. 20, an exemplary process flow of the graphics processor 501 is shown in more detail. When the target position input is received by the graphics processor 501, the signal is decoded by a decoder/extractor. The decoder/extractor may also decode and extract the target's indication, alert status, and time input. The target's position information may be decoded into Cartesian coordinates (x, y, z), or in other coordinates, such as Spherical. The extracted coordinates of the target's position are then forwarded to a transform engine. The target position input may be a target's exact location relative to a vehicle, or the target position input may be a predicted position of a target relative to a vehicle. Whether the target position input is predicted or exact depends on the latency inputs 700, the kinematics inputs 690, and vehicle orientation inputs 680 received by the alignment system 500.

The transform engine receives the 3D coordinates of the target position input, considers a number of dynamic error factors 650 (such as the curved mirror position 660, eye position 670, vehicle orientation 680, kinematics 690, and latency 700), and then translates the 3D coordinates into pixel coordinates using ray tracing principles simplified to vector math.

Figure 22:
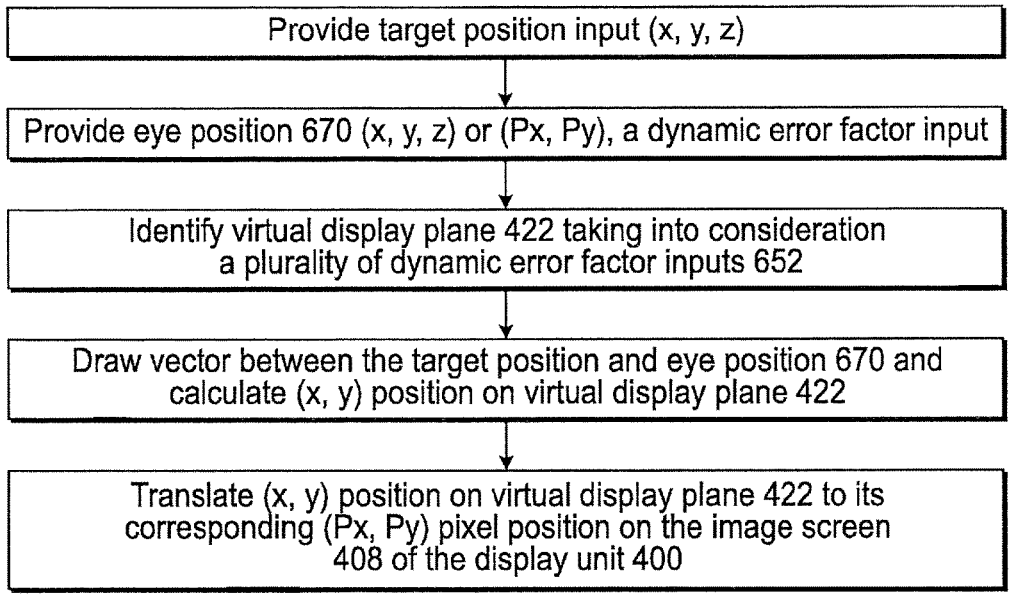
FIG. 22 shows the process flow of one exemplary transform engine.

Referring now to FIG. 22, an exemplary transform engine may work as follows. The transform engine receives a target position input, which may be a 3D position relative to an FCM 202 (FIG. 1), or another predetermined location. In the example in FIG. 21, which illustrates how the transform engine calculates the appropriate position for an image to be displayed on the virtual display plane, the target 106 is a pedestrian located at Point X, which has a 3D coordinate position ($x_1$, $y_1$, $z_1$). The transform engine may also receive an input for the driver's eye position 670 in the form of 3D coordinates, such as ($x_2$, $y_2$, $z_2$). Here, the eye position 670 of the operator is at Point Y. The coordinates of the eye position 670 are relative to the tracking camera 204 (FIG. 1). Design Data inputs, and in this case the Vehicle Layout data, may synch the target position input and the eye position input 670 such that they are both taken relative to one reference point, as opposed to two reference points. For instance, if a position vector between the FCM 202 and tracking camera 204 is known, the eye position input 670 may be given to the transform engine as a position relative to the FCM 202, even though the driver's eye position is sensed by tracking camera 204. Using one reference point may be beneficial as it may reduce the number of computations the alignment system 500 is required to make.

A virtual display plane 422 is then identified. The virtual display plane 422 falls within the FOV capabilities of the AR system 100, and is the plane in which virtual images 418 appear. The virtual display plane 422 may be set to appear at a given distance from the operator's eye location such that a virtual image 418 appears at some distance in front of the vehicle, as one of skill in the art will appreciate. The virtual display plane 422 may move vertically (up or down) based on various dynamic error factor inputs, such as the position of the curved mirror 660, and vehicle orientation inputs 680. System latency 700 (i.e., a time input) may also be taken into consideration in combination with the vehicle orientation 680 and kinematics 690 to determine if a further adjustment of the virtual display plane 422 is necessary. It is also important to note that the virtual display plane 422 is not necessarily normal to the ground. The virtual display plane 422 may be tilted with respect to a lateral axis to better accommodate the viewing perspective of a driver. Dynamic error factor inputs may be considered in identifying the necessary tilt of the virtual display plane 422. Furthermore, it is also important to note that the virtual display plane 422 is not necessarily a plane having an infinite radius of curvature. In other words, the virtual display plane 422 is not necessarily flat; the virtual display plane 422 may have a curved shape.

After the virtual display plane 422 has been identified, a vector is drawn between the eye position 670 and the target position. Here, if the pedestrian is known to be at Point X and the eye position is known to be at Point Y, the transform engine will compute a vector between Points X and Y. In one embodiment, based on the latency and kinematics inputs 700, 690, the position of a target may be predicted. In this instance, the pedestrian location at Point X will be a predicted position relative to the vehicle.

The transform engine will then determine if vector $\overrightarrow{XY}$ intersects the virtual display plane 422, and if so, the transform engine determines where vector $\overrightarrow{XY}$ intersects the virtual display plane 422. In FIG. 21, vector $\overrightarrow{XY}$ intersects the virtual display plane 422 at Point H, which may have 2D coordinates (x, y) or 3D coordinates (x, y, z) depending on whether the virtual display plane 422 is a 2D or 3D virtual display plane 422. The coordinates (x, y) of the intersection point, in this case Point H, may then be used to determine the pixel coordinates $(P_x, P_y)$ that are to be projected from the image screen 408 of the display unit 400. If the virtual display plane 422 is a 3D geometric shape, the (z) coordinate helps determine the scale of the image to be projected. Each position (x, y) on the virtual display plane 422 may have a corresponding $(P_x, P_y)$ location (see FIG. 25) on the image screen 408 of the display unit 400. Thus, once the appropriate (x, y) position is known, the pixel $(P_x, P_y)$ position is also known.

Figure 23:
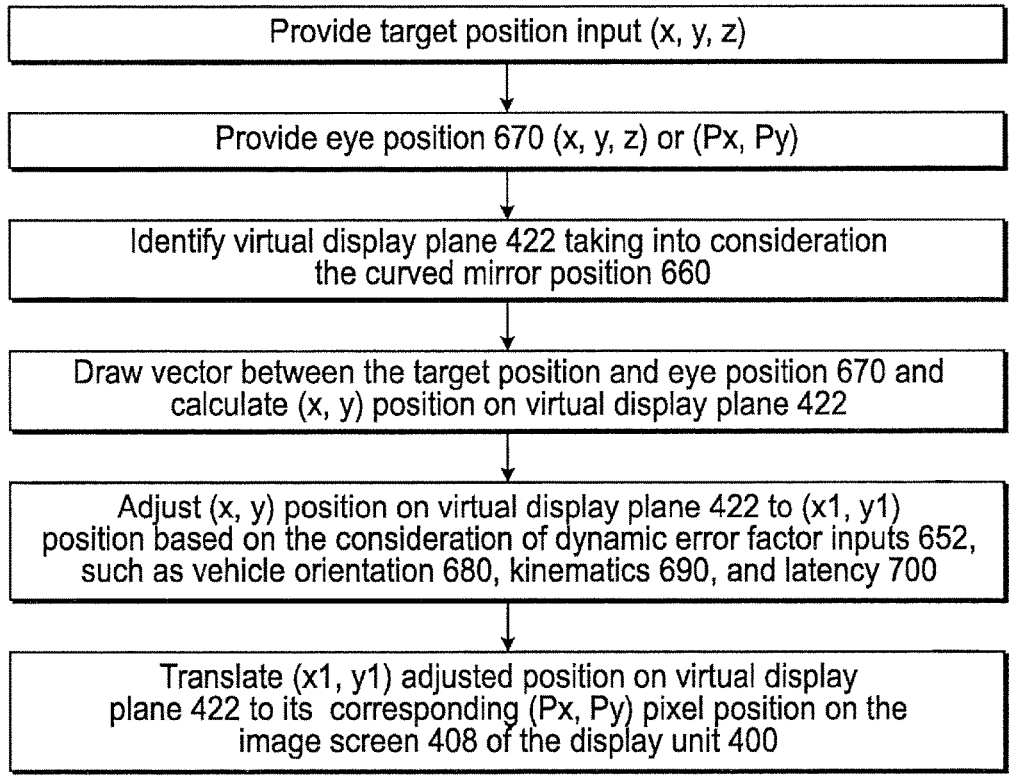
FIG. 23 shows the process flow of a second exemplary transform engine.

Referring now to FIG. 23, a process flow diagram illustrating another embodiment of an exemplary transform engine is shown. The transform engine receives a target position input, including its 3D position (x, y, z). The transform engine also receives an eye position (x, y, z). A virtual display plane 422 is then identified, taking into consideration the curved mirror position 660. A vector is then drawn between the eye position and target position. The intersection point, or the point in which the vector intersects the virtual display plane 422, is then calculated. The intersection point may have a location (x, y). The (x, y) intersection point may then be adjusted to a first adjusted position (x1, y1) based on consideration of dynamic error factor inputs 652, such as vehicle orientation 680 and kinematics 690, as well as system latency 700. The first adjusted position (x1, y1) may then be translated into a corresponding $(P_x, P_y)$ pixel position.

Figure 24:
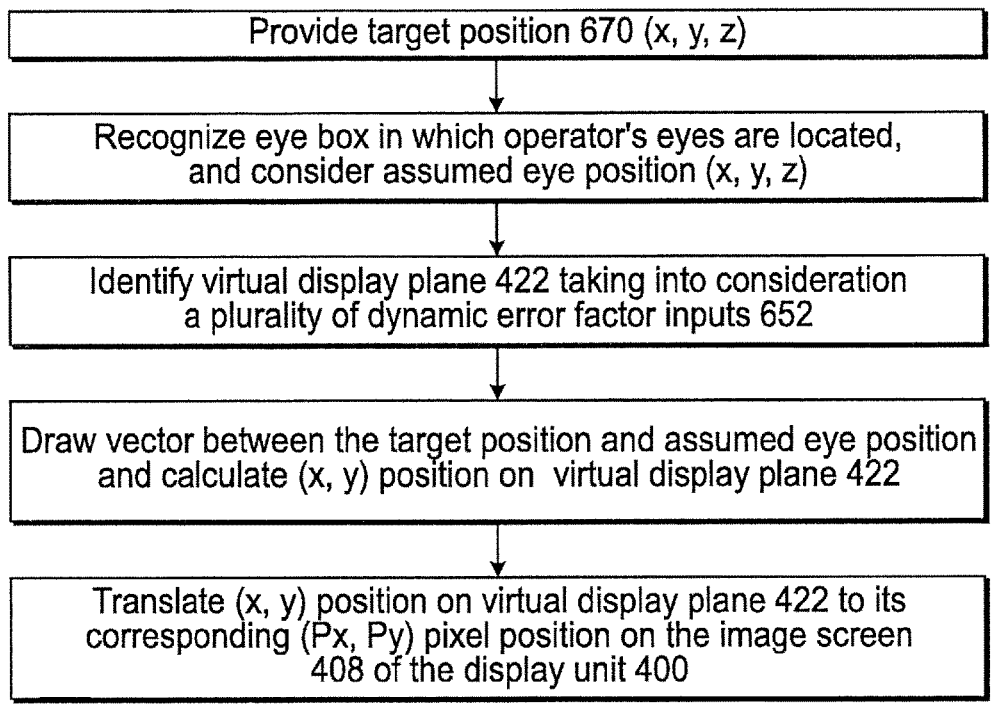
FIG. 24 shows the process flow of a third exemplary transform engine.

Referring now to FIG. 24, a process flow diagram of a third exemplary embodiment of a transform engine is shown. In this embodiment, the transform engine may receive a target position input, which includes its 3D position (x, y, z). Then, the transform engine may recognize the eye box 674 in which the operator's eyes are located, and then the transform engine assumes an eye position of the operator's eyes within that eye box 674. The assumed eye position could be the center of a given eye box, for example. A virtual display plane 422 is then identified, taking into consideration the curved mirror position 660, and other dynamic error factor inputs 652. A vector is then drawn between the target and the assumed eye position, and an intersection point (x, y) is calculated where the vector intersects the virtual display plane 422. The (x, y) intersection point is then translated into its corresponding pixel position $(P_x, P_y)$, which is a position on the image screen 408 of the display unit 400 (see FIG. 5). It must be noted that removing eye and/or head tracking may limit the AR system's ability to properly highlight targets at all potential driver eye positions, as an assumed eye position is not an actual eye position.

Referring again to FIG. 20, the pixel position coordinates exit the transform engine as $(P_x, P_y)$. Px provides the coordinate for the lateral placement of the virtual image on the virtual display plane 422, and Py provides the coordinate for the vertical placement of the virtual image on the virtual display plane 422. The pixel coordinates $(P_x, P_y)$ are forwarded to a graphics generation processor. The graphics generation processor generates a graphic output based on the pixel position coordinates $(P_x, P_y)$. The graphics generator processor may also process the target's indication and alert status information to produce a particular graphic having a particular status. After the graphic output is generated, it is then sent to the warping processor 502.

Figure 25:
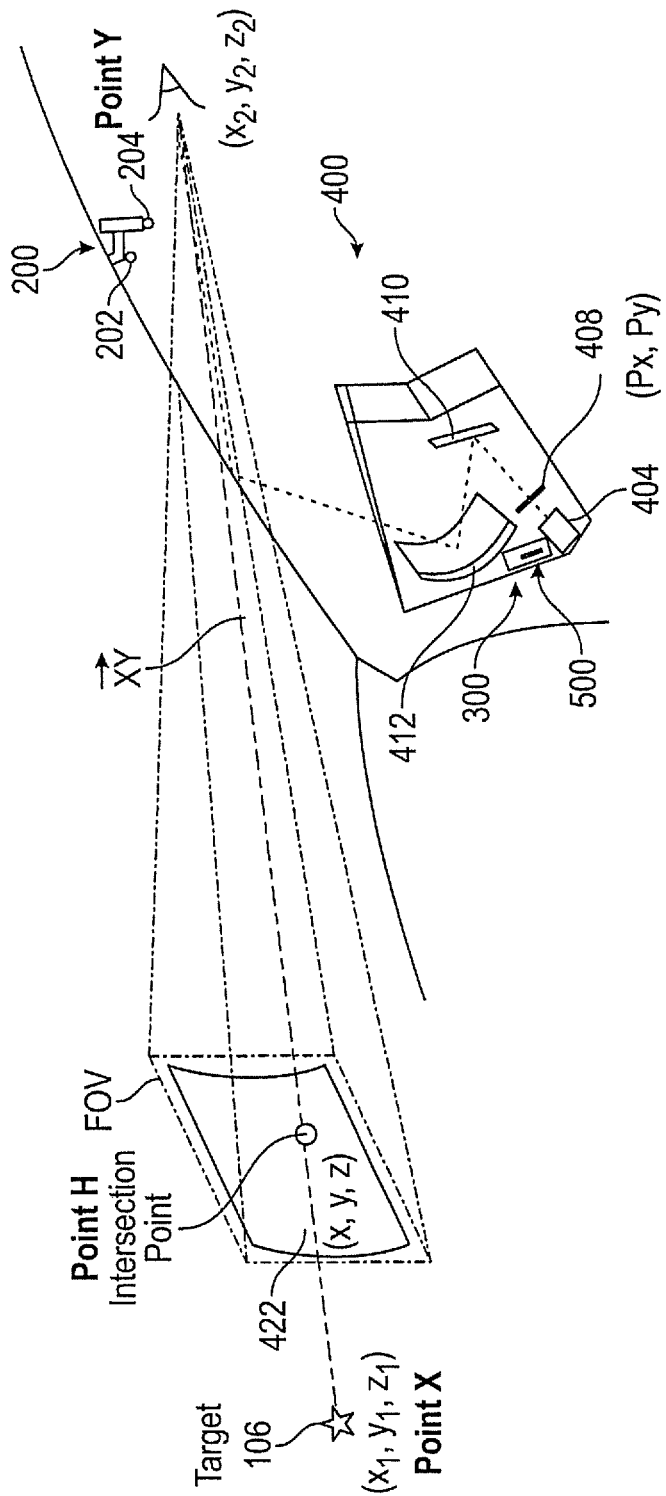
FIG. 25 is a side view of a vehicle showing an exemplary AR system.

Referring to FIG. 25, the process flow of an exemplary graphics processor will be summarized. The graphics processor may receive a target position input in (x, y, z) coordinates. In this example the target 106 is a star, and the star is located at a Point X. A decoder/extractor extracts the appropriate position data from the target position input, and forwards the target position data to the transform engine of the graphics processor. The transform engine receives the target position coordinates (x, y, z), and also receives a plurality of dynamic error factor inputs 652 (e.g., curved mirror position 660, eye position 670, vehicle orientation 680, kinematics 690, and latency 700), which may be applied in real time by the transform engine to render a properly aligned virtual graphic. Based on the target position input and a plurality of dynamic error factor inputs 652 (which may be just one), the transform engine identifies a virtual display plane 422, draws a vector between the target 106 and an eye position (even one that is assumed), and then calculates the intersection point of the vector with the virtual display plane 422. Here, the eye position is located at Point Y. A vector $\overrightarrow{XY}$ is shown extending between the target position (Point X) and eye position (Point Y). The intersection point, in this case Point H, may have a position (x, y, z) on the virtual display plane 422. Based on the (x, y) intersection position of Point H, the transform engine translates the intersection point coordinates (x, y) (which may additionally be adjusted by dynamic error factor inputs 652) into pixel position coordinates ($P_x$, $P_y$). The (z) coordinate may be used to determine the fore/aft position of the intersection point on the virtual display plane 422, and may be used as an input by the graphics generation processor to determine the scale of a projected image. The pixel coordinates ($P_x$, $P_y$) are then sent to a graphics generation processor, where a graphic output is produced based on the pixel position coordinates ($P_x$, $P_y$). The graphic output is then sent to the warping processor.

Warping Processor

With reference again to FIG. 19, the warping processor 502 receives the graphic output ($P_x$, $P_y$) from the graphics processor 501, corrects the graphic output for image distortion and image deflection based on a plurality of dynamic error factor inputs 652 and a plurality of static error factor inputs 612, and then forwards a final graphic output ($P'_x$, $P'_y$) to the display unit 400. An exemplary alignment system 500 may be configured to correct for image distortion and image deflection in real time such that a final graphic output, when projected by a display unit 400, produces a virtual image properly aligned with a real-world target substantially free of distortion.

As noted above, image distortion may be caused by a plurality of dynamic error factors 650, including a curved mirror position 660 error factor and an eye position 670 error factor. A change in the position of the curved mirror 412 and/or a change in eye position may cause image distortion by changing the optical systems of an AR system 100. Static error factors 610, including windshield surface variation 620, mounting variation 630, and display unit optical variation 640 may cause image distortion by changing the optical systems from vehicle to vehicle, as variation from a vehicle's master design specifications may range in a matter of degrees, which is unacceptable for AR systems. Image deflection, or image misalignment due to system latency 700 during or after graphics generation, may be corrected for by the warping processor 502 as well.

An exemplary warping processor 502 may correct for image distortion by reversing it using an inverse warping technique (i.e., predistortion). Image distortion may include geometric distortions, pincushion and/or barrel distortions, lateral chromatic aberration, and color and luminance, to name a few. Predistortion may involve the use a warp map to dynamically move input pixels (e.g., ($P_x$, $P_y$)) into output pixels (e.g., ($P'_x$, $P'_y$)). A warp map essentially provides a system with spatial transformation instructions such that an input pixel coordinate may be assigned to a particular output pixel coordinate. Warp maps may be created by a variety of methods, including a calibration method, a predicted corrections method, or a combination thereof. A calibration method might include the method of calibrating distortion of an image as disclosed in U.S. Pat. No. 8,406,562 owned by GEO Semiconductor, Inc., which is hereby incorporated by reference in its entirety. A predicted corrections method may include creating warp maps based on windshield measurement data and associated optical analysis derived from a large sample size of production windshields.

Warp maps may be stored in a memory unit, such as a machine readable storage medium, of a graphics unit 300. When a particular dynamic or static error factor input is received by the alignment system 500, the warping processor 502 may include instructions to retrieve the correct warp map from the graphic unit's memory, and the distortion may be corrected for by a predistortion technique, such as the use of predistortion algorithms to invert graphic distortion. Other known methods may also be used. The predistortion process eliminates various distortions such that a substantially distortion-free image appears before an operator.

Referring still to FIG. 19, the graphics processor 501 is shown sending the graphic output to the warping processor 502 via a video stream. The graphics processor 501 may also send other communications to the warping processor 502, such as target indication data, the target's alert status, graphics generation latency 700, vehicle orientation 680, and vehicle kinematics 690, as well as other information not relevant to alignment. The warping processor 502 is shown configured to receive Input Data and Design Data inputs. Input Data may include inputs for dynamic error factors 650, including curved mirror position 660, eye position 670, vehicle orientation 680, vehicle kinematics 690, and latency 700. Once these dynamic error factor inputs 652 are received, the appropriate warp maps may be selected and used to correct for image distortion caused by these dynamic error factors 650. The selected curved mirror position warp map, the selected eye position warp map, and the selected latency warp map may be combined into one dynamic error factor warp map. Aside from the dynamic error factor inputs 652, other Input Data may include calibration data that includes a plurality of warp maps that may account for the static error factor inputs 612. Calibration data can also be used to correct for dynamic error factor inputs 652 as well. If the windshield surface, mounting, and display unit optical variation are calibrated or predicted at a component level for each static error factor 610, then each static error factor 610 may have a corresponding warp map; meaning, there may be a windshield surface variation warp map, a mounting variation warp map, and a display unit optical variation warp map. These various warp maps may be combined into one static error factor warp map. Alternatively, if the windshield surface, mounting, and display unit optical variation are calibrated or predicted at a system level, then a single static error factor warp map 611 may be derived without need for the individual static error factor warp maps.

The warping processor 502 may receive Design Data inputs as well. The Design Data that may be input into the warping processor 502 may comprise Dynamic Distortion Prediction data for the eye position 670 error factor and Curved Mirror Distortion Prediction data for the curved mirror position 660 error factor. Based on the latency inputs 700, Image Deflection Distortion Prediction data (i.e., image deflection warp maps) may be input into the warping processor 502 to account for latency 700. The Image Deflection Distortion Prediction data may also be used to look up or calculate the correct warp map by taking into consideration the graphics generation latency 700, the vehicle kinematics 690, and vehicle orientation 680. The warp maps associated with the distortion prediction data is based on large sample size vehicle data that may be used to make "predicted corrections" for image distortion. In this context, predictive or predicted data means that these warp maps are designed for a particular vehicle model, as opposed to the predictions being specific to a given vehicle.

It is important to note that the warping processor 502 need not utilize all Input Data inputs and Design Data inputs, as image distortion can be corrected for by a number of different predistortion methods, including but not limited to: using calibrated warp maps in combination with a set of predicted warp maps, using only predicted warp maps, and using only calibrated warp maps. Other combinations are also possible.

The details of the warping processor 502 will be discussed in three parts: first, the process in which the warping processor 502 accounts for the static error factors 610, including windshield surface variation 620, mounting variation 630, and display unit optical system variation 640 will be addressed. Second, the manner in which the warping processor 502 addresses image distortion caused by dynamic error factors 650 will be discussed. Third, the process by which the warping processor 502 accounts for image deflection will be discussed.

Static Error Factors

The warping processor 502 corrects for distortion caused by static error factors 610, including windshield surface variation 620, mounting variation 630, and display unit optical variation 640.

As noted above, in one embodiment, the windshield surface, mounting, and display unit optical variation static error factors 610 may each have associated warp maps that may be used to correct for image distortion. This would be the case in the event the warp maps for the various static error factors 610 were calculated at a component level. In another embodiment, the windshield surface, mounting, and display unit optical variation static error factors 610 may be combined into one static error factor warp map that accounts for all of the static error factors 610. This single static error warp map may be used to correct for image distortion.

Figure 26:
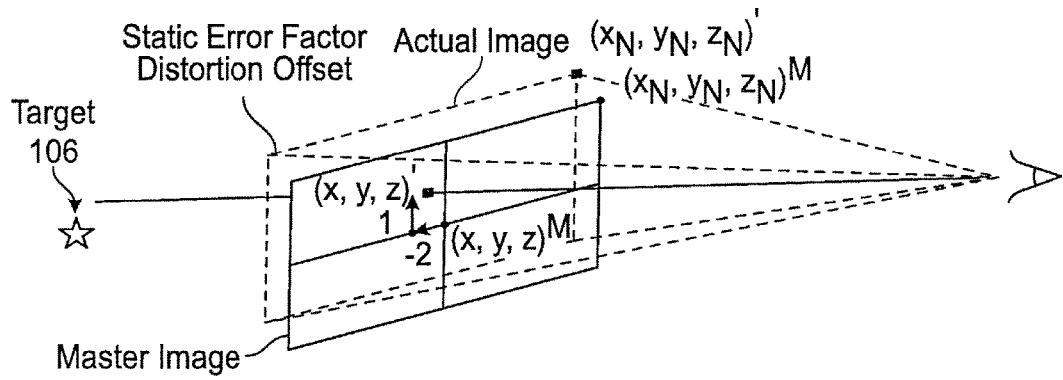
FIG. 26 shows an exemplary projected image distorted with respect to a master image due to a plurality of static error factors.

FIG. 26 shows an actual image (dotted lines) distorted with respect to the master image (solid lines) due to a plurality of static error factors 610. The master image is shown having an origin with coordinates $(x, y, z)_M$. The master image is positioned in the location the image would be if the AR system 100 did not have windshield surface variation, mounting variation between the windshield 102 and display unit 400, or if the display unit optical systems did not have any variation from its master design. As is typically the case, however, there is generally a combination of windshield surface variation 620, mounting variation 630, and display unit optical variation 640 from the vehicle's master design specifications. Thus, as shown in FIG. 26, the actual image may be distorted with respect to the master image.

In this example, it is desirable to project a virtual image precisely at the origin $(x, y, z)_M$ of the master image such that it overlays the target 106, which in this case is a star. However, due to static error factor distortion, the center of the actual image is shown projected at a location $(x, y, z)'$, which is two counts to the left and one count upward from the origin $(x, y, z)_M$. This may be deemed a static error factor distortion offset. A warp map may correct for this distortion caused by the static error factors 610. A warp map may comprise a set of instructions to assign a given set of coordinates $(x_N, y_N, z_N)'$ to corresponding $(x_N, y_N, z_N)_M$ master image coordinates.

Figure 27:
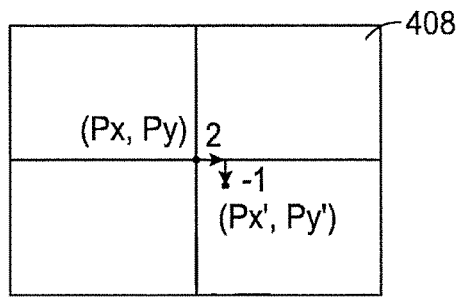
FIG. 27 shows an image screen showing how a static error factor warp map would reverse the distortion to the projected virtual image of FIG. 26.

Continuing with the example above, a static error factor warp map may then be used to reverse the static error factor distortion offset via an inverse warping technique. In FIG. 27, an image screen 408 is shown. Here, the coordinates of the origin of the master image $(x, y, z)_M$ correspond with pixel position $(P_x, P_y)$ of the image screen 408. To reverse the distortion, the static error factor warp map will instruct the warping processor 502 to dynamically move the pixels $(P_x, P_y)$ to a position $(P'_x, P'_y)$. The pixel position $(P'_x, P'_y)$ is shown two counts to the right and one count downward from the pixel position $(P_x, P_y)$. This effectively will place the projected virtual image at the correct location on the virtual display plane 422 and will correct for the distortion caused by a plurality of static error factors 610.

Dynamic Error Factors

As noted above, the warping processor 502 may correct for image distortion caused by dynamic error factors 650. More specifically, the warping processor 502 may correct for curved mirror position 660 and eye position 670 related errors; the warping processor 502 may consider and correct for other dynamic error factors 650 as well. The warping processor 502 may also correct for image deflection, which will be addressed in an image deflection section below.

Curved Mirror Position

Changes to the optical system associated with curved mirror position 660 movement may be addressed by reversing the distortion of the HUD graphics, or in other words, by using an inverse graphic distortion technique, also known as image warping. The optical systems can be designed to provide an acceptable image for medium height drivers, but as the curved mirror moves to accommodate all driver heights, the optical systems change, creating distortion.

Figure 30:
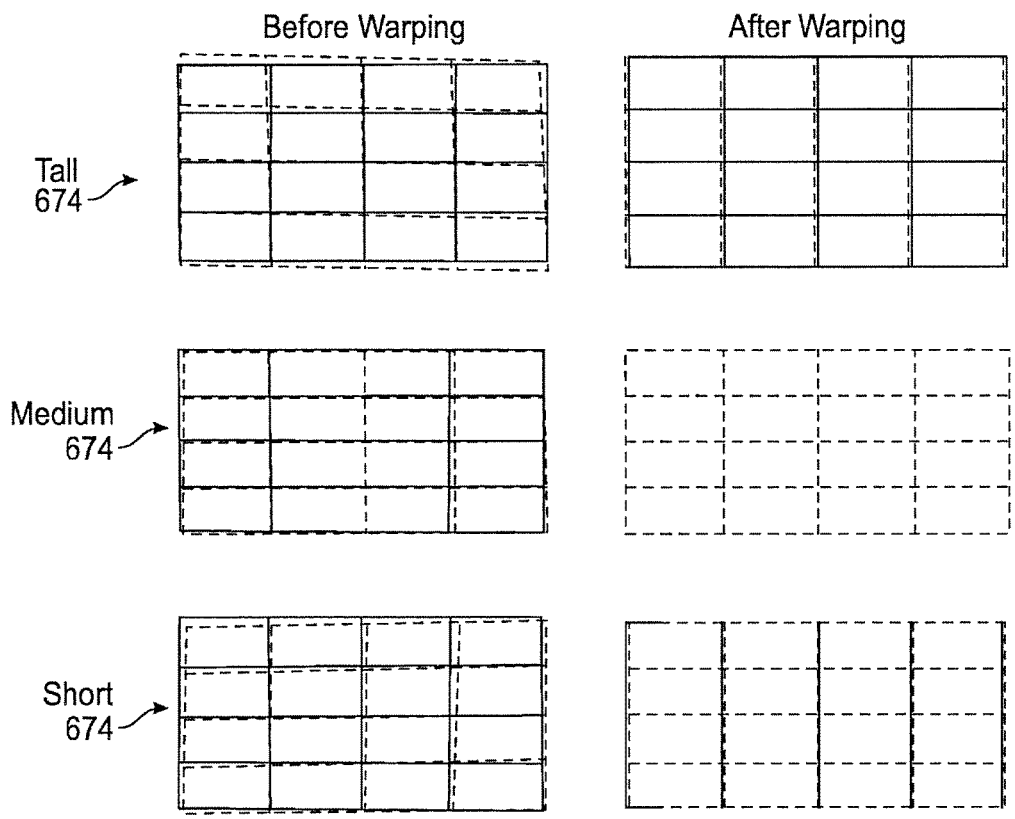
FIG. 30 illustrates distortion caused by changes to the optical system when the curved mirror is rotated to accommodate drivers of differing heights.

Referring now to FIG. 30, the column on the left labeled "Before Warping" illustrates the effect that movement of the curved mirror position 660 has on image quality. The solid lines represent the master images, and the dotted lines represent the actual images. The actual virtual image for the medium height driver is shown containing minimal distortion. However, the virtual images produced for both the tall T and short S eye boxes 674 show significant image distortion due to movement of the curved mirror. The column on the right labeled "After Warping" shows the positive effect that image warping has on image quality, even for varying driver heights. As is evident from the figure, the images that have undergone image warping are substantially free of distortion.

To accomplish image warping of distorted images, calibration data, predictive data, or a combination thereof can be used to correct for curved mirror position change.

Eye Position

Like curved mirror position 660 distortion correction, changes to the optical systems associated with eye and/or head movement 670 may similarly be solved by a number of predistortion techniques. However, unlike the rotatable curved mirror that is typically set to a specific driver height and then maintained as a constant during driving, a driver's eye point may constantly change. As the driver's eye point is constantly changing, this forces the graphics correction latency to be near real time. In one embodiment, distortion correction hardware may reduce latency by being designed to focus solely on graphics pixel movement/warping, as opposed to a graphics processor-based system where the distortion processing is run like an application on the existing graphics unit (along with other applications). In this manner, stripping away layers of reconfigurable processing reduces system latency. Such warping engine hardware is known in the art, and may be for example a GW3100 processor manufactured by GEO Semiconductor, Inc. In another embodiment, distortion correction may be accomplished by running an image warping application on the graphics unit 300.

Referring again to FIG. 16, distortion associated with eye position movement for an exemplary eye box 674 having nine driver eye positions 676 (3 rows and 3 columns) is illustrated. Each driver eye position 676 represents how an image would appear to a driver if the driver's eyes were located within that particular driver eye position 676. It should be noted that an eye box 674 may have any combination of rows and columns. For example, an eye box 674 may have nine rows and eleven columns, for a total of ninety-nine driver eye positions 676. The optical distortion of the images caused by eye/head movement can be clearly seen in FIG. 16. The actual images (dotted lines) are shown distorted with respect to the master images (solid lines). In this example, the further away from the center driver eye position 676 of the eye box 674, the greater the image distortion.

In one embodiment, each driver eye position 676 may have an associated calibrated warp map. Depending on the driver eye position 676 in which the driver's eyes are located, the proper calibrated warp map may be selected from the memory unit of the graphics unit 300, and then may be used to correct for the image distortion at that particular driver eye position 676. As a driver's eye position may constantly change, it is preferable that the plurality of eye position warp maps be stored in an easily accessible memory unit.

In another embodiment, as will be discussed more fully below, image distortion correction may be accomplished by a combination of calibrated warp maps and predicted warp maps.

Predicted Data

In one embodiment, calibrated warp maps may be combined with predicted warp maps to correct for image distortion. Calibrated warp maps are those that are calculated specifically for a particular vehicle. Predicted warp maps are vehicle model specific, or simply model specific, and may be calculated based on windshield measurement data and associated optical analysis derived from a large sample size of windshields. It will be appreciated that if a given AR system 100 is designed for applications other than for automobiles, such as for a watercraft or aircraft, that measurement data and associated optical analysis will necessarily need to be gathered and undertaken to develop predicted warp maps for that particular vehicle model.

Figure 31:
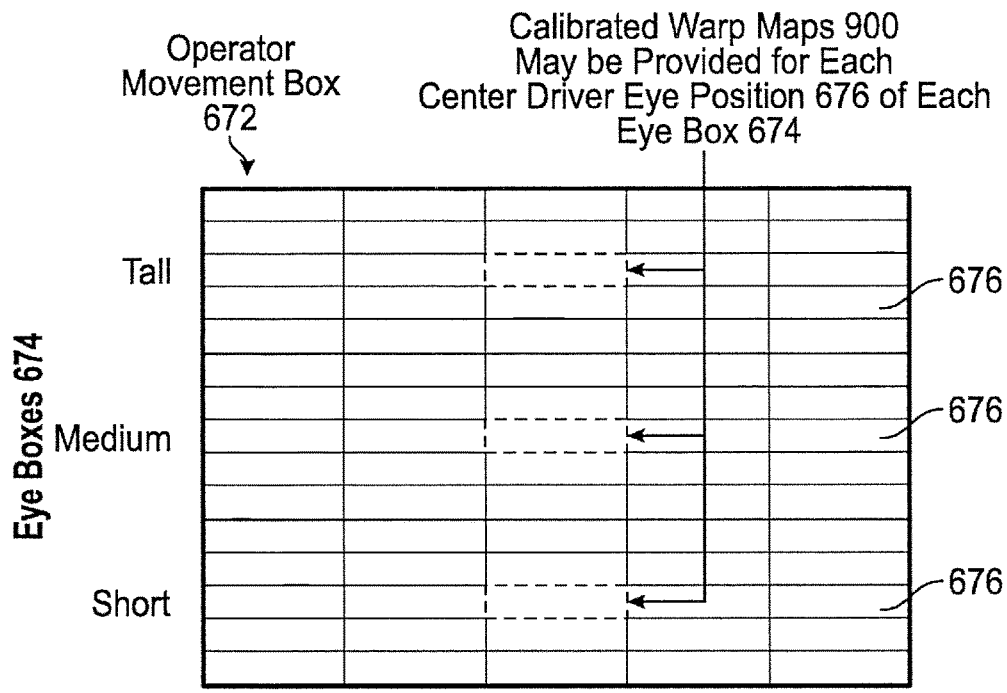
FIG. 31 shows the center driver eye position of each eye box having a calibrated warp map created therefor.

Referring now to FIG. 31, as mentioned previously, a given operator movement box 672 may contain a number of eye boxes 674. For instance, there could be three eye boxes 674 (for small S, medium M, and tall T drivers) or five eye boxes 674 (for small, medium-small, medium, medium-tall, and tall) in a given operator movement box 672. Each eye box 674 may contain a number of driver eye positions 676 (e.g., an eye box 674 with five rows by five columns would have twenty-five driver eye positions 676). As illustrated in FIG. 31, in an embodiment where calibrated predistortion data is combined with predictive predistortion data, calibrated warp maps 900 need only be calculated for one driver eye position 676 of each driver eye box 674. Preferably, the center driver eye position 676 or a driver eye position 676 near the center of an eye box 674 is chosen to be calibrated. In this example, only the center driver eye positions 676 of each eye box 674 have calibrated warp maps. It will be appreciated that more than one driver eye position 676 per eye box 674 may be calibrated, as this may improve image warping capabilities. In fact, all driver eye positions 676 within an eye box 674 may be calibrated. However, limiting the number of calibrated warp maps may also be advantageous, as there may be corresponding production efficiencies in calibrating fewer warp maps.

Figure 32:
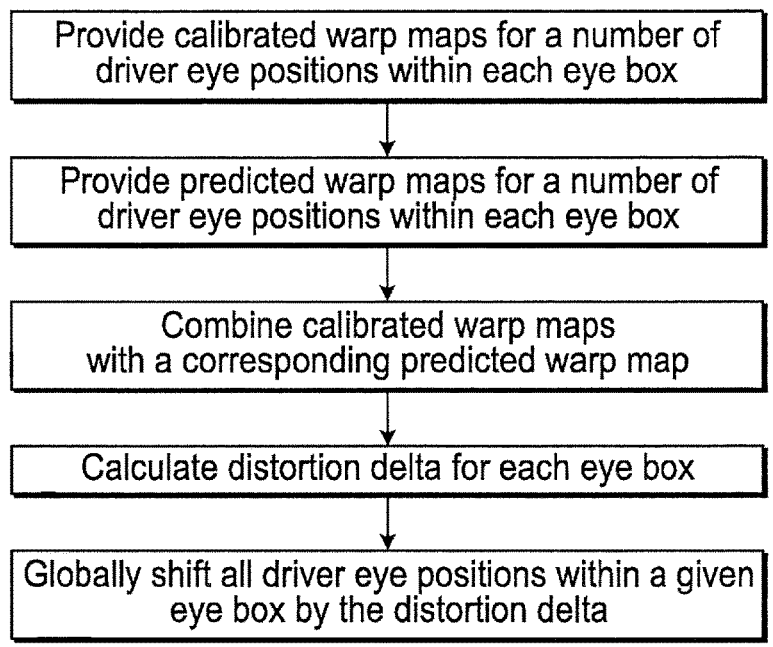
FIG. 32 shows an exemplary process flow of how predicted data may be used in combination with calibrated data.
Figure 36:
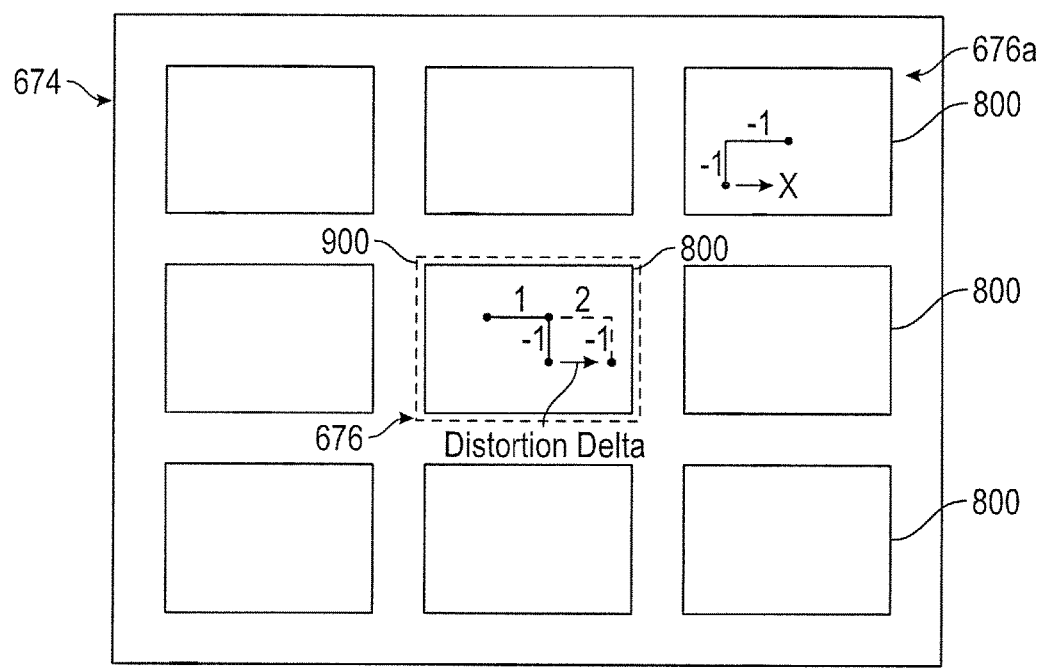
FIG. 36 shows how predicted data may be combined with calibrated data to determine a distortion delta for a given eye box.

With reference to FIG. 36, the calibrated warp maps 900 for the center driver eye position 676 of each eye box 674 may be combined with predicted warp maps 800, and from there, a distortion delta may be calculated. A distortion delta may be calculated in the following manner. As shown in FIG. 36, a number of predicted warp maps 800 are shown for various driver eye positions 676 of a given eye box 674. The center driver eye position 676 is shown having an associated predicted warp map 800 and an associated calibrated warp map 900. In this example, the predicted warp map 800 for the center driver eye position 676 instructs that an image should be moved one unit to the right and one unit down to correct for image distortion. The calibrated warp map 900 for the center driver eye position 676 instructs that an image should be moved two units to the right and one unit down to correct for distortion. Accordingly, there is a distortion delta of one lateral unit to the right. This distortion delta may be used to globally shift each predicted warp map 800 within that eye box 674. For example, the predicted warp map 800 for the top-right driver eye position 676a instructs that an image should be moved one unit left and one unit down to correct for image distortion. As the distortion delta for this particular eye box 674 is one lateral unit to the right, the end result will be that the top-right driver eye position 676a should be shifted one unit down to the location of the X to correct for distortion. FIG. 32 summarizes the process flow of how predicted data may be combined with the use of calibrated data.

Figure 33:
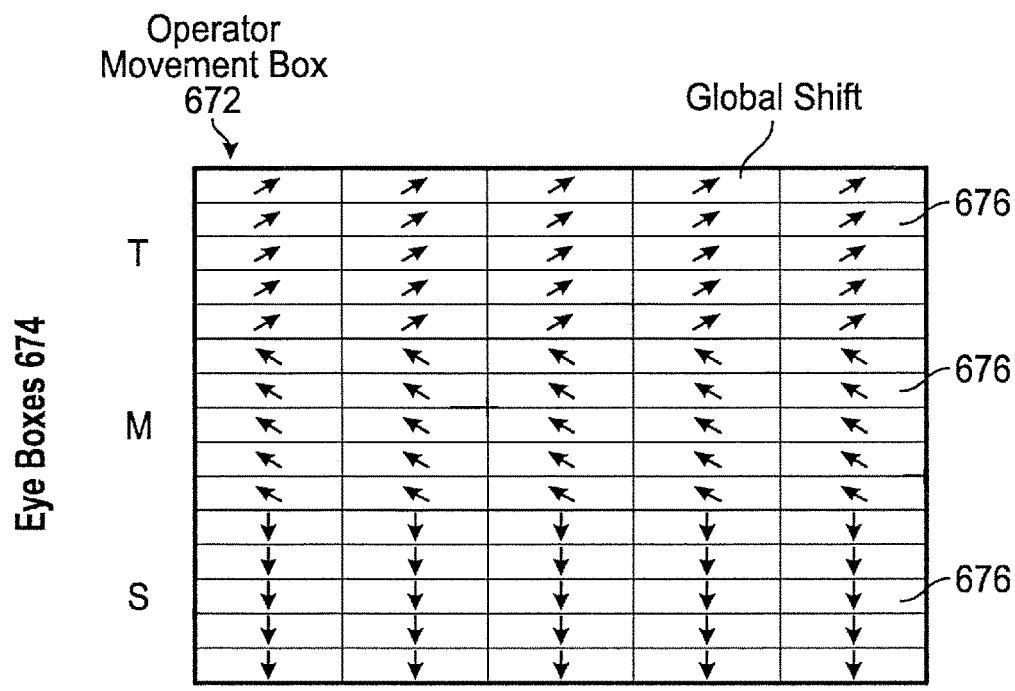
FIG. 33 illustrates how driver eye positions may be globally shifted by a distortion delta calculated for a given eye box.

FIG. 33 shows how the calculated distortion deltas for each eye box 674 may be used to globally shift an image for each driver eye position 676 within a given eye box 674. The operator movement box 672 is shown comprising three eye boxes 674: T, M, and S (tall, medium, and short). The arrows shown in each driver eye position 676 of the M eye box represent the global shift that will occur in each driver eye position 676 of the M eye box. The T eye box and S eye box show different examples of how the distortion delta is used to globally shift each driver eye position 676 within a given driver eye box 674. As shown in the figure, no matter the position of a driver's eyes within a given eye box 674, a corresponding distortion delta may be used to globally shift the driver eye positions 676 such that distortion may be corrected.

In the event calibrated warp maps have not been created or are simply not desired to be used, the use of predicted warp maps 800 may be used as the sole means to correct for image distortion. Alternatively, calibrated warp maps 900 may be calculated for each driver eye position 676 of each driver eye box 674 such that calibrated warp maps 900 are used as the sole means to correct for distortion. As detailed above, calibrated warp maps 900 may be used in combination with predicted warp maps 800 as means to correct for image distortion.

The distortion delta is premised on an assumption: although the eye position distortion changes drastically from vehicle to vehicle and windshield to windshield, the distortion deltas from the center driver eye position 676 to other driver eye positions 676 in the same eye box 674 is constant enough from vehicle to vehicle such that it may be predicted. Although windshields 102 may have variation from part to part, they possess the same general rate of shape change over small linear distances. This assumption has been supported by large sample quantity mass production windshield measurement data and associated optical analysis.

Figure 34:
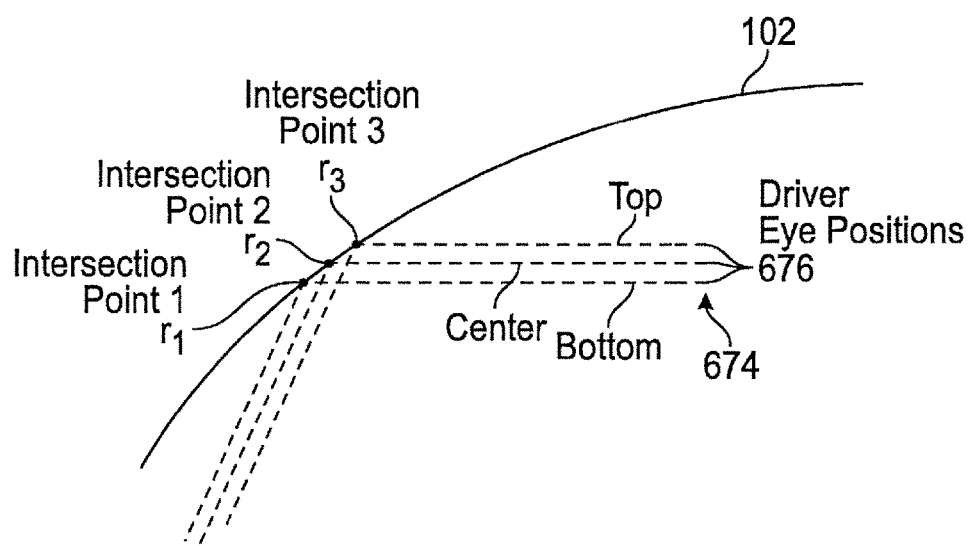
FIG. 34 illustrates an exemplary windshield having incident light rays projected by a display unit reflecting off of its surface.

This point can be further illustrated with a discussion of FIG. 34. For a given eye box 674, the different driver eye positions 676 within that eye box 674 may be associated with different windshield intersection points as shown in FIG. 34. These windshield intersection points represent a series of optical systems, and as such will result in differing distortion profiles. The physical characteristic of the windshield 102 that gives rise to the distortion profile at each specific intersection point can be denoted generally as r. In this example, the eye box 674 has three rows of driver eye positions 676, including a top, center, and bottom row. Each row of the driver eye positions 676 corresponds with a windshield intersection point, denoted as $r_3$ for the top driver eye position, $r_2$ for the center driver eye position, and $r_1$ for the bottom driver eye position.

Figure 35:
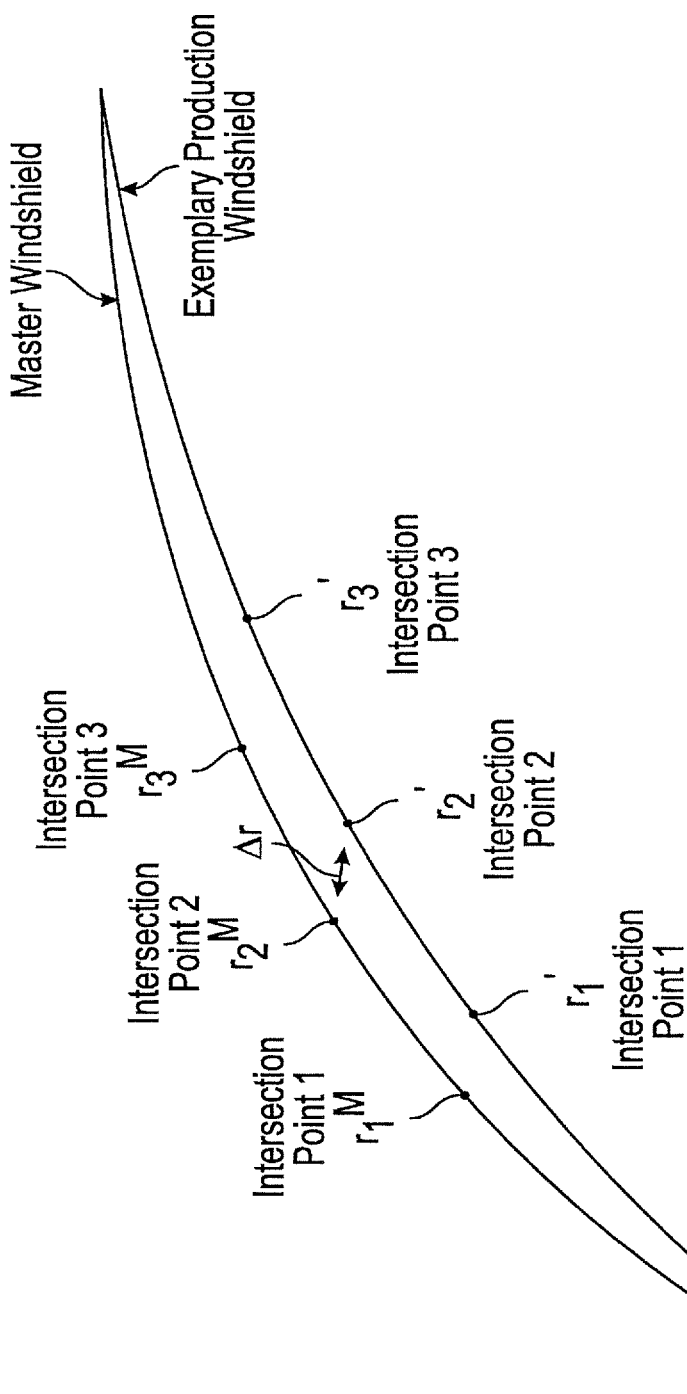
FIG. 35 compares an exemplary production windshield with an exemplary master windshield and shows the relationship between their respective general rate of shape change over small linear distances.

Referring now to FIG. 35, the assumption can be stated as follows. Suppose that a warp map for the center driver eye position 676 of the master windshield is calculated based on master windshield intersection point data $r_2^M$, and a warp map for an exemplary production windshield is calculated based on exemplary production windshield intersection point data $r'_2$. Then, the physical characteristic delta giving rise to the distortion delta between the exemplary production windshield and the master windshield can be represented as $\Delta r = r'_2 - r_2^M$. In practice, $\Delta r \sim r'_1 - r_1^M \sim r'_3 - r_3^M$, meaning that the distortion delta calculated for the center driver eye position 676 is also applicable to the other driver eye positions 676 within the same eye box 674, as windshields may have the same general rate of shape change over linear distances from windshield to windshield.

Image Deflection

As noted previously, image deflection may be caused by system latency. The total system latency can be expressed as the amount of time necessary for the entire Sense→Register→Render→Display process to take place. The warping processor 502 may take into account the time that these various processes take, as well as kinematics inputs 690, to account for image deflection. Image deflection correction is essentially a last minute, or more accurately, a last millisecond 2D alignment adjustment of the graphic output.

As shown in FIG. 19, a time input (latency input) is received by the graphics processor 501. This time input corresponds with the amount of time it took a sensing unit 200 to sense an environment, identify a relevant real-world target and register its corresponding position, indication, and alert status. As the graphics processor 501 renders a graphic output, the time required to render the graphic output is calculated and forwarded to the warping processor 502. The graphics processor 501 may also receive a kinematics input 690 that provides inputs regarding the vehicle's velocity relative to the target 106. Moreover, the display unit 400 may send feedback to the warping processor 502 that relays the time period that it takes the display unit 400 to project an image (not shown). With these latency 700 and kinematics inputs 690, the alignment system 500 may predict a target's position at a predetermined time such that a virtual image will properly overlay a target at the predetermined time. While the kinematics 690 and system latency 700 may be considered at the graphics rendering stage in the graphics processor 501, image deflection correction involves a distortion correction in the warping processor 502 just before a graphic output is sent to the display unit 400.

Referring again to FIG. 18, image deflection may be corrected for in the following manner. Suppose in this example, that the graphics generation process took two hundred (200) milliseconds. Utilizing the time input, (200 milliseconds of system latency for graphics generation) and the velocity of the target 106 with respect to the vehicle 110, the target's position may be predicted to be at a location Position 2 at time equals $t_2$. Accordingly, the alignment system may use this predicted target position to select an appropriate warp map to dynamically move the pixels of the projected image such that the image is aligned with the target 106.

Figure 28:
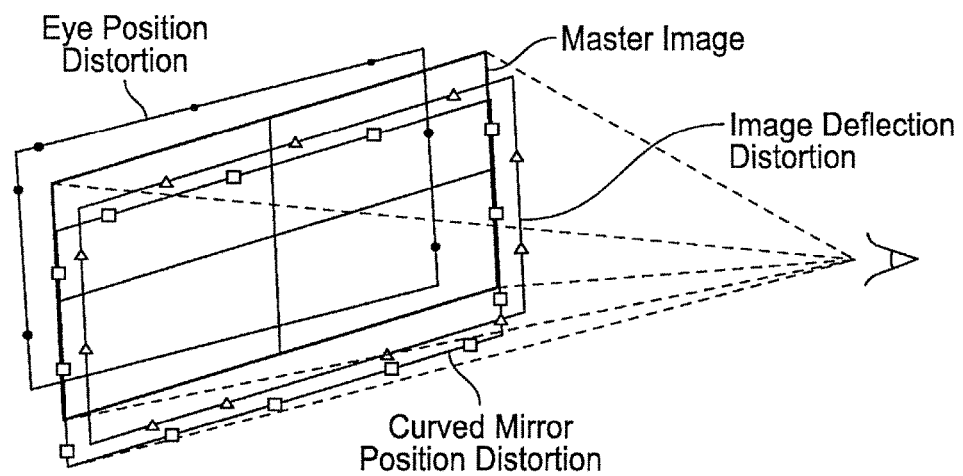
FIG. 28 shows how a number of dynamic error factors may each cause image distortion with respect to a master image.
Figure 29:
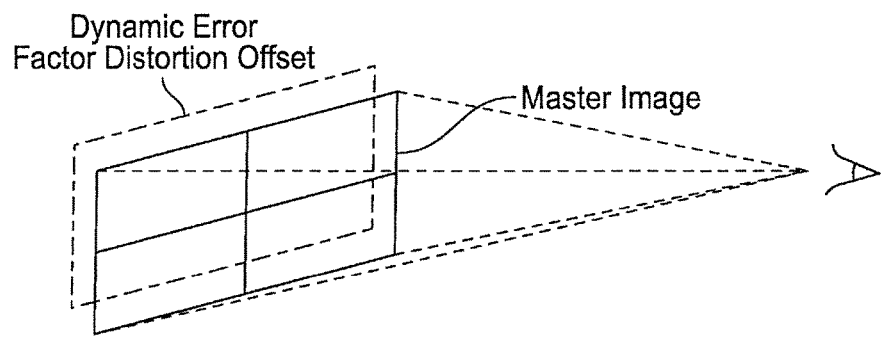
FIG. 29 shows how image distortion caused by a number of dynamic error factors can be combined into a dynamic error factor distortion offset.

Referring now to FIG. 28, image deflection and image distortion caused by dynamic error factors may be corrected for in the following manner. Dynamic error factors may distort an actual image with respect to a master image as shown in FIG. 28. A curved mirror position distortion, eye position distortion, and the kinematics and latency distortion (kinematics and latency collectively form an "image deflection distortion") are depicted representing how each dynamic error factor may distort an actual image with respect to the master image. These distortions caused by the named dynamic error factors may each be corrected for by individual dynamic error factor warp maps. Alternatively, a single dynamic error factor distortion offset may be calculated, considering all of the distortions caused by the individual dynamic error factors, and a single dynamic error factor warp map may be used to reverse the image distortion and deflection. FIG. 29 shows how the dynamic error factor distortions may be combined into one dynamic error factor distortion offset such that only a single dynamic error factor warp map need be used to correct for the image distortion and deflection. Based on the dynamic error factor warp map, a pixel input ($P_x$, $P_y$) may be dynamically moved to output pixels ($P'_x$, $P'_y$), which may be considered the final graphic output to be projected by a display unit. Moreover, it should be noted that the dynamics error factors offset may be combined with the static error factors offset such that a single error factor warp map may correct for image distortion and deflection in the same manner as shown in FIG. 27.

The words used herein are understood to be words of description and not words of limitation. While various embodiments have been described, it is apparent that many variations and modifications are possible without departing from the scope and sprit of the invention as set forth in the appended claims.

The invention claimed is:

1. An augmented reality alignment method for use in a vehicle, comprising:
    sensing a position of a target in a driver's field of view;
    sensing a position of the driver's eye(s) to provide a first dynamic error factor;
    generating a graphic output comprising a graphic image that is to be projected onto a windshield of the vehicle;
    modifying the graphic output based on the first dynamic error factor to reduce distortion and misalignment of the graphic image caused by variations in the position of the driver's eye(s); and
    projecting the graphic image associated with the modified graphic output onto the windshield of the vehicle, which graphic image is aligned with the target from the perspective of the driver.

2. The augmented reality alignment method of claim 1, wherein the graphic output is further modified for at least a second dynamic error factor.

3. The augmented reality alignment method of claim 2, wherein the second dynamic error factor is a curved mirror position input.

4. The augmented reality alignment method of claim 2, wherein the second dynamic error factor is a latency input.

5. The augmented reality alignment method of claim 1, wherein the graphic output is further modified for at least one static error factor.

6. The augmented reality alignment method of claim 5, wherein the static error factor is selected from a windshield surface variation input, a mounting variation input, and a display unit optical variation input.

7. The augmented reality alignment method of claim 1, wherein modifying the graphic output includes providing calibration data for the position of the driver's eye(s); providing predictive data for said position of the driver's eye(s); combining said calibration data with said predictive data to calculate a distortion delta; and shifting pixels of said graphic output to be projected at the position of the driver's eye(s) by said distortion delta.

8. The augmented reality alignment method of claim 1, wherein projecting said graphic output results in an image substantially aligned with said target with a position error of below about 0.5 degrees and substantially distortion free.

9. An augmented reality alignment system for a vehicle comprising:
   a processing unit, said processing unit having a memory, said memory including instructions executable by said processing unit, said instructions including instructions for:
   sensing a position of a target in a driver's field of view;
   sensing a position of the driver's eye(s) to provide a first dynamic error factor;
   generating a graphic output comprising a graphic image that is to be projected onto a windshield of the vehicle so that it overlays the position of the target from the driver's perspective;
   modifying the graphic output based on the first dynamic error factor to reduce distortion and misalignment of the graphic image caused by variations in the position of the driver's eye(s); and
   projecting the graphic image associated with the modified graphic output onto the windshield of the vehicle, which graphic image is aligned with the target from the perspective of the driver.

10. The augmented reality alignment system of claim 9, wherein the graphic output is further modified for at least a second dynamic error factor.

11. The augmented reality alignment system of claim 10, wherein the second dynamic error factor is a curved mirror position input.

12. The augmented reality alignment system of claim 10, wherein the second dynamic error factor is a latency input.

13. The augmented reality alignment system of claim 9, wherein the graphic output is further modified for at least one static error factor.

14. The augmented reality alignment system of claim 13, wherein the static error factor is selected from a windshield surface variation input, a mounting variation input, and a display unit optical variation input.

15. The augmented reality alignment system of claim 9, wherein modifying the graphic output includes providing calibration data for the position of the driver's eye(s); providing predictive data for said position of the driver's eye(s); combining said calibration data with said predictive data to calculate a distortion delta; and shifting pixels of said graphic output to be projected at the position of the driver's eye(s) by said distortion delta.

16. The augmented reality alignment system of claim 9, wherein projecting said graphic output results in an image substantially aligned with said target with a position error of below about 0.5 degrees and substantially distortion free.

\* \* \* \* \*